United States Patent [19]
Yamamoto et al.

[11] Patent Number: 5,680,574
[45] Date of Patent: Oct. 21, 1997

[54] DATA DISTRIBUTION UTILIZING A MASTER DISK UNIT FOR FETCHING AND FOR WRITING TO REMAINING DISK UNITS

[75] Inventors: Akira Yamamoto; Takao Satoh, both of Sagamihara; Shigeo Honma, Odawara; Yoshihiro Asaka, Hiratsuka; Yoshiaki Kuwahara, Odawara; Hiroyuki Kitajima, Yokohama, all of Japan

[73] Assignee: Hitachi, Ltd., Tokyo, Japan

[21] Appl. No.: 355,274

[22] Filed: Dec. 12, 1994

Related U.S. Application Data

[63] Continuation of Ser. No. 648,998, Jan. 31, 1991, abandoned.

[30] Foreign Application Priority Data

Feb. 26, 1990 [JP] Japan ................................ 2-42452

[51] Int. Cl.⁶ .............................. G06F 12/12; G06F 9/38
[52] U.S. Cl. .................. 395/464; 395/421.03; 395/383; 395/439; 395/440; 395/441
[58] Field of Search ................................ 395/425, 275, 395/284, 440, 441, 383, 421.03, 439, 464; 364/DIG. 1, 237.9, 964.28, 964.3, 967.1, 971.1, 952.1

[56] References Cited

U.S. PATENT DOCUMENTS

| | | |
|---|---|---|
| 4,791,564 | 12/1988 | Takai ........................................ 395/439 |
| 4,837,680 | 6/1989 | Crockett et al. ........................ 395/284 |
| 4,881,169 | 11/1989 | Tanaka et al. ...................... 395/185.08 |
| 4,882,671 | 11/1989 | Graham et al. ........................ 395/309 |
| 4,888,691 | 12/1989 | George et al. ...................... 395/182.13 |
| 5,155,835 | 10/1992 | Belsan ...................................... 395/441 |
| 5,155,845 | 10/1992 | Beal et al. ........................... 395/182.04 |

FOREIGN PATENT DOCUMENTS

| | | |
|---|---|---|
| 59-135563 | 8/1984 | Japan. |
| 60-114947 | 6/1985 | Japan. |
| 61-28128 | 6/1986 | Japan. |
| 2-37418 | 2/1990 | Japan. |

OTHER PUBLICATIONS

Information Process Institute Bulletin "Nishigaki et al. Analysis on Disk Cache Effects in a Sequential Access Input Process", vol. 25, No. 2, pp. 313–320 (1984).

*Primary Examiner*—Tod R. Swann
*Assistant Examiner*—J. Peikari
*Attorney, Agent, or Firm*—Fay, Sharpe, Beall, Fagan, Minnich & McKee

[57] ABSTRACT

The control unit arbitrarily selects a disk unit among the disk units that are inactive when the control unit receives an input/output request involving either read or staging. For a write request, the control unit selects a master disk unit in the disk unit group for the immediate writing of data, and a disk unit other than the above-mentioned master disk is preferably selected to execute the read and staging unit. After writing is used to write the data into the other disk units after the write request execution is completed by writing to the master disk unit.

47 Claims, 15 Drawing Sheets

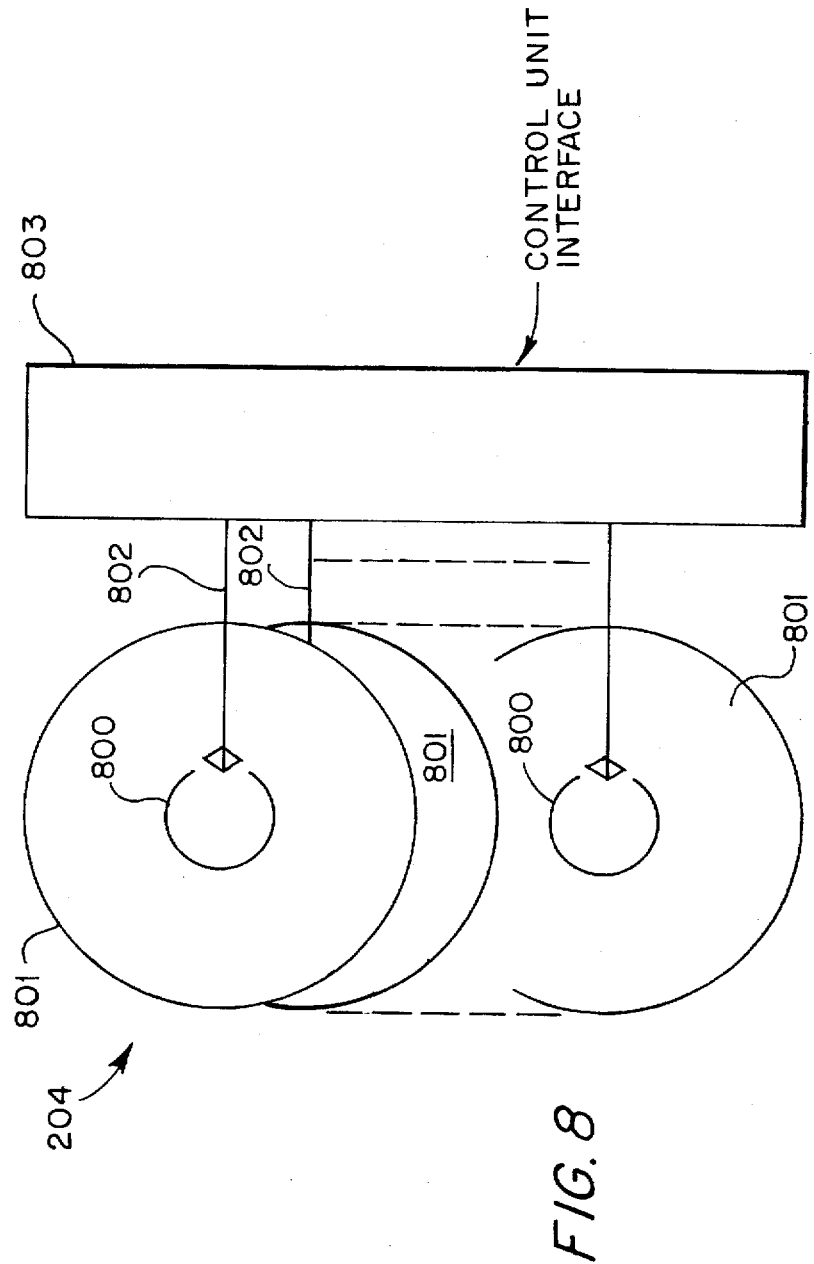
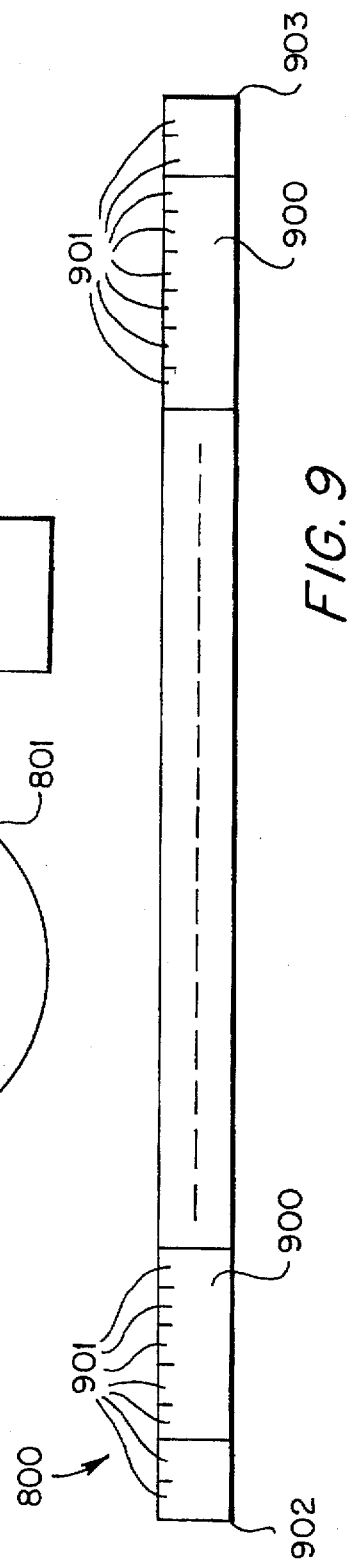
FIG. 8
FIG. 9

DATA DISTRIBUTION UTILIZING A MASTER DISK UNIT FOR FETCHING AND FOR WRITING TO REMAINING DISK UNITS

This is a continuation application of Ser. No. 07/648,998, filed Jan. 31, 1991 now abandoned.

BACKGROUND OF THE INVENTION

The present invention relates to the control of the execution of a load for a storage, particularly the control of parallel processing with respect to input and output for disk drives.

In Japanese Patent Laid-Open No. 114947/1985, a double write control has a cache (hereinafter referred to simply as a cache). Two disks, called double write disks, are each written with the same data. A control unit processes an input output request from a CPU for one of the two disk units. In the case of receiving a read request (input request) from the CPU, the control unit executes the request as it is. In the case of receiving a write request (output request) from the CPU, data is written in a specific one of the double write disks and at the same time the same data is written in the cache. At a later time, making use of available processing time when the control unit and disks have nothing else to do, the control unit writes the same data from the cache into the other disk unit, which is called a write after process. In this manner, the same data is written to each disk unit of the double write disk units.

In Japanese Patent Publication No. 28128/1986, there is disclosed a double filing control for load distribution with respect to double write disk units. There is no write after process. The control is designed to achieve a higher processing speed by selecting an inactive disk unit, among the disk units, when an input/output request is received. An inactive disk unit will be defined herein as a disk unit that is currently not undergoing any disk accessing, that is not undergoing any read or write operation.

In a thesis found in the Information Process Institute Bulletin "Nishigaki et al: Analysis on Disk Cache Effects in a Sequential Access Input Process", Vol. 25, No. 2, pages 313–320 (1984), there is disclosed with respect to a single disk unit a read ahead control having a cache, which involves the staging, in the cache, data not requested by the CPU but which will be requested in an instruction shortly following the current instruction. This staging process is executed by the control unit independently of any execution of an input/output request from the CPU.

SUMMARY

It is an object of the present invention to solve problems, analyzed below, that the inventors have found with respect to the above-noted controls.

Japanese Patent Laid-Open No. 114947/1985 does not give any attention to a potential advantage of the double write disk system, namely that a plurality of disk units can be controlled by the control unit, but instead the document discloses that the CPU input/output request is limited to one specific disk unit as requested by the CPU. Therefore, even though there is another disk unit that may be inactive, the request cannot be fulfilled by the control unit if the CPU requests the one specific disk unit that happens to be active at the time. The disk unit is considered active when it is undergoing some type of input/output process.

On the other hand, Japanese Patent Publication No. 28128/1986 has excellent performance by selecting an inactive disk unit by the control unit for an input/output request from the CPU. However, this is applied to the double write function by utilizing a cache without a write after control, and therefore it's reliability is lowered. This is due to the high possibility that write data is received from the CPU that is applicable to all the disk units, but is stored in the cache without being immediately written to a disk unit. Therefore, if power failure occurs in the cache in combination with the breakdown of any one of the disk units, the write data received from the CPU is lost.

Furthermore, in the case of a control unit having a cache, the control unit can execute an input/output between the cache and the disk unit independently of an input/output request from the CPU, as disclosed in the thesis in the Information Process Institute Bulletin, mentioned above. In view of this, the inventors think that attention should be given to the possibility that a plurality of disk units can be selected for an input/output process by the control unit independently of an input/output request from the CPU.

Japanese Patent Laid-Open No. 135563/1984 does not have any relation to the double write system. This patent relates to the cache disk control unit with a write after control. The disk control unit stores the write data received from the CPU to both the cache memory and the non-volatile memory. The write data in the cache memory is written to the disk unit by utilizing a write after process. Therefore, the write request issued by the CPU can be processed at high speed without accessing the disk unit, moreover, this can realize the highly reliable write after process. If the write data in the cache memory is lost because of the breakdown of the cache memory, the write data remains in the non-volatile memory. However, this patent does not relate to the double write function. Japanese Patent Laid-Open No. 37418/1990 relates to the double write system including the cashe disk control unit with a write after control. In this patent, the cashe disk control unit has the bit map information to recognize the area in the disk unit where the write data in the cashe has not been written yet. The bit map information is utilized to reduce the recovery time when the cashe unit breaks down. However, this patent does not relate to the load distribution among the disk units in the disk unit group.

Specifically, the present invention relates to the control for providing a write after process using a cache so that the same data may be written to a disk unit group, comprising one or more disk units. If the disk unit group comprises one disk unit, the disk unit has a plurality of disks on each of which is written the same data. If the disk unit group comprises a plurality of disk units, each disk unit may have one or more disks, with the same data being written to each disk unit of the group.

The object of the present invention is to provide control for improving parallel execution of input/output processes by distributing the processes among disk units in the disk unit group, for distributing the load of the input/output processes under the control of the control unit.

To better understand the present invention, input/output processes, which the control unit executes between the control unit and the disk units can be classified into four kinds, as follows:

(1) A write request received from the CPU, which requires access to a disk unit.

(2) A read request received from the CPU, which requires access to a disk unit.

(3) A staging process performed independently of an input/output request from the CPU (that is independently of a read request or a write request from the CPU), which transfers the data from a disk unit to a cache.

(4) A write after process executed between the control unit and a disk unit.

Of the above mentioned four kinds, the write after process is not an object for load distribution, as will be explained later. The write after process is executed, with respect to a disk unit group, for all of the disk units other than those to which the same data has already been written, when a write request received from the CPU is executed. Therefore, there is no freedom for selecting a disk unit which should be used to execute the write after process. Therefore, in the above four processes, the first three processes are objects for load distribution.

In the present specification, two kinds of load distribution according to the present invention will be discussed.

In the first kind of load distribution, the control unit selects a disk unit among the disk units that are inactive when the control unit executes an input/output process involving either the second (read) or third (staging) kind of process. When a disk unit should be selected for a write request from the CPU, which requires access to the disk unit according to the first type of the four mentioned input/output processes, the control unit selects a specific disk unit in the disk unit group for the immediate writing of data.

In the second kind of load distribution, when the control unit selects a disk unit for an input/output process of the first type, that is for the write request received from the CPU which requires access to a disk unit, a specific disk unit in the disk unit group is selected. When a disk unit is selected to execute an input/output process of the second and third types (read and staging), a disk unit other than the above-mentioned specific disk unit is selected, preferably arbitrarily.

The functions of the first kind of load distribution will be discussed. When a control unit receives from the CPU a read request which requires access to a disk unit, the control unit executes the following process. For the read request, the control unit selects arbitrarily (that is independently of the CPU, which includes according to an algorithm implemented in the control unit), a disk unit among the inactive disk units in the disk unit group (each of the disk units in the disk unit group has on it the same data to be read). If no inactive disk unit is found among the disk units of the disk unit group, the control unit will place the read request in a wait state. In the case of receiving a write request from the CPU requiring access to a disk unit, the control unit selects one specific disk unit, hereinafter called the master disk unit, among all the disk units of the disk unit group. If the specific disk unit, particularly the master disk unit, is active with respect to some other input/output process, the control unit will place the write request in a wait state. In the case of executing a staging performed by the control unit independently of an input/output request from the CPU, an inactive disk unit among the disk units of the disk unit group is selected for the staging, that is for transfer of information between the disk unit and the cache. If all of the disk units subject to such a selection are active with some other input/output process, the control unit places the staging in a wait state.

In general, an input/output process placed in a wait state will be periodically reviewed to see if it can be executed, and if it can be executed, it will be executed.

The first type of a load distribution according to the present invention has improved reliability and improved features, with respect to the control disclosed in the above-mentioned documents. As compared with the control disclosed in Japanese Patent Laid-Open No. 114947/1985, the first type of distribution according to the present invention is slightly inferior in the distribution effect for the write request, but as compared with the control disclosed to Japanese Patent Publication No. 28128/1986, the present invention provides superior and excellent performance. The first type of load distribution according to the present invention has a restriction with respect to the free selection of the disk unit for a write request. Accordingly, the distribution effect is lower as compared with the control of Japanese Patent Laid-Open No. 114947/1985 that can select any disk unit within the disk unit group. However, for a read request, any inactive disk unit is selected by the present invention. Usually, there is a far greater number of read requests than the number of write requests, for disk units in general, and the ratio is approximately 3:1 to 4:1. Therefore, the first load distribution type shows not so large a degradation in the performance as compared with the control disclosed in Japanese Patent Laid-Open NO. 114947/1985. On the other hand, as compared with the control disclosed in Japanese Patent Publication No. 28128/1986, which uses one disk unit intensively for all input/output requests, the first type of load distribution according to the present invention shows a far better performance.

The reliability of the first type of load distribution according to the present invention is higher than the reliability provided by the disclosure of Japanese Patent Laid-Open No. 114947/1985, and is almost equal to that of the method disclosed in Japanese Patent Publication 28128/1986. For the first kind of load distribution according to the present invention or the Japanese Patent Publication No. 28128/1986, there is no data for the write after process for the disk unit for which write requests are intensively assigned. The write after process does not write data to any specific disk unit for which write requests are intensively assigned. Therefore, even if there is a power failure in the cache, no write data received from the CPU is lost unless the specific, master disk unit intensively storing all of the write requests is also damaged. If, according to Japanese Patent Publication No. 28128/1986 the write request was immediately executed for a random one of the disk units and the write data was saved in the cache for a later write after. Therefore, if the cache lost its data before the write after could be completed and any one of the disks in the disk unit group is damaged, the data could be completely lost. Whereas in the present invention, the write request is always immediately executed with respect to one specific disk, a master disk, so that even if the data is lost in the cache before the write after process can be completed, the data can be read from the master disk reliably. Accordingly, the load distribution of the first type according to the present invention has high performance and high reliability with respect to a disk unit group, in a well balanced manner.

The function of the second type of load distribution, according to the present invention, will be discussed.

When the control unit receives from the CPU a write request requiring access to a disk unit in the disk unit group, the control unit selects one specific disk unit, hereinafter called the master disk unit, among all the disks units of the disk unit group for immediate execution of the write request, and also writes the same data to the cache for later execution of the write after process. However, if this specific disk unit, the master disk unit, is in an active state, the control unit places the write request in a wait state. When receiving a read request from the CPU requiring access to a disk unit in a certain disk unit group, the control unit executes the following process. First, one arbitrary (arbitrary with respect to the CPU and selectable according to random distribution or some algorithm by the control unit) disk unit in an inactive state is selected from among the disk units of the disk unit group other than the above-mentioned specific disk unit, that is other than the master disk unit. That is, the read request is performed with respect to any of the disk units of the disk unit group except for the master disk unit. If no inactive disk unit is found among the disk units other than this master disk unit, the master disk unit is then examined to determine whether or not it is inactive. If the master disk unit is inactive, as determined by such examination, the control unit selects the master disk unit to complete the read request, and if the examination reveals that the master disk unit is currently active, the control unit will place the read request in a wait state.

When attempting to execute a stage process independently of an input/output request from the CPU, the control unit performs the following process, for the second load distribution kind in the present invention. First one arbitrary disk unit is selected among the inactive disk units of the disk unit group other than the master disk unit. If no inactive disk unit is found for such selection, the master disk unit is examined to determine whether or not it is inactive. If this determination finds the master disk unit inactive, the control unit selects the master disk unit for execution of the staging, and if the examination finds that the master disk unit is active, the control unit places the staging in a wait state.

The reason why the second load distribution kind according to the present invention is more desirable than the first load distribution kind is as follows. As an example, let it be assumed that a read request is assigned to a specific disk unit for which write requests from the CPU are intensively assigned, more specifically, the master disk unit, by the first load distribution kind. If a write request is received before the process for the read request is completed, the control unit cannot start executing the write request. Therefore, the disk units other than the master disk unit should preferably be assigned for any processes other than the write request from the CPU. Thus, the load distribution effect can be enhanced by the second type of load distribution of the present invention as compared with the first type of load distribution and as compared to the load distribution of the above-mentioned documents.

BRIEF DESCRIPTION OF THE DRAWINGS

Further, objects, features and advantages of the present invention will become more clear from the following detailed description of a preferred embodiment of the present invention, with reference to the accompanying drawing, wherein:

FIG. 8 illustrates the structure of a disk unit;

FIG. 9 illustrates the structure of a track;

DETAILED DESCRIPTION

All of the following figures and description apply equally to the first type of load distribution according to the present invention and the second type of load distribution according to the present invention, except where the differences are specifically disclosed with respect to the second type of load distribution that is a modification of the first type of load distribution.

Figure 2:
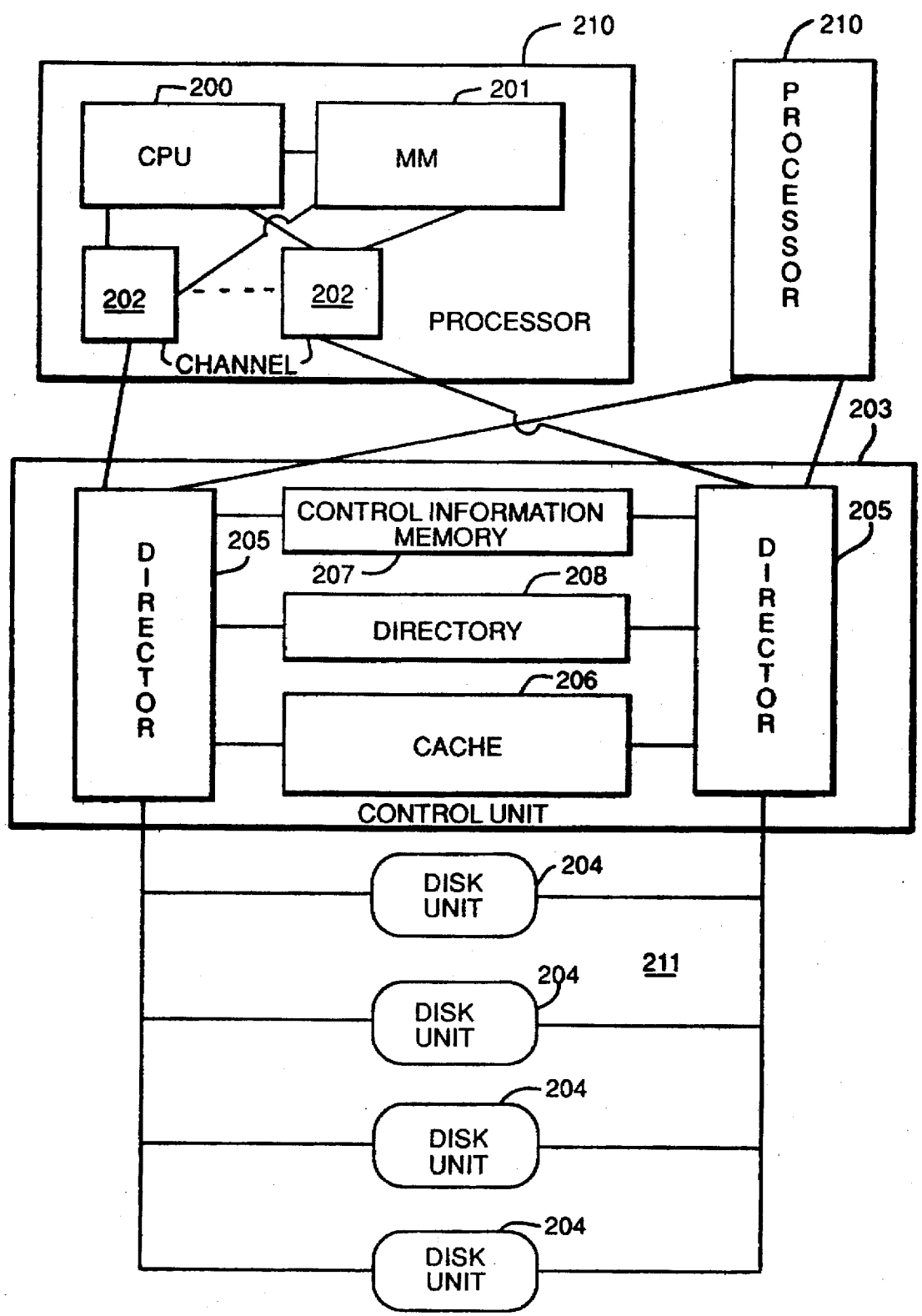
FIG. 2 is a block diagram showing the configuration of a computing system of the present invention.

FIG. 2 is a block diagram showing the configuration of a computing system of the present invention. The computing system comprises: a plurality of processors 210, each having a CPU 200, a main memory (MM) 201 and channels 202; a control unit 203; and a plurality of disk units 204 grouped into a lesser plurality of disk unit groups 211. In this respect, it will become clear from the following description that the present invention is applicable to the control unit 203 connected to a single or a plurality of processors 210, as indicated. There are a plurality n of disk units 204 grouped into each of a plurality m of disk unit groups 211, that is, each of the m disk unit groups 211 has more than n disk units 204. The number of n disk units 204 belonging to each disk unit group 211 may vary among the disk unit groups. Each disk unit 204 belongs to a specific disk unit group 211. The method for designating the disk unit group 211 to which the respective disk unit 204 belongs is not directly related to the present invention and therefore will be omitted from the description.

The control unit 203 comprises more than one director 205, a cache (for example a volatile memory such as a DRAM) 206, control information memory 207 and directory 208. Each of the directors 205 selectively transfers data between a channel 202 and a disk unit 204, between a channel 202 and the cache 206, and between the cache 206 and a disk unit 204. The cache 206 stages data that requires more frequent access, which data is also stored along with other less frequently accessed data in the disk units 204. The directory 208 stores information needed to manage the cache 206. The staging is executed by the directors 205. A specific example of staging data can be the object data accessible from the CPU 20, and the stored data in the vicinity of this data in the disk unit 204.

The control unit 203, to which the present invention is specifically directed, has the function to write the same data to all of the disk units 204 belonging to a certain disk unit group 211, that is, the so-called multiple writing function. Therefore, it can be considered that the processor 210 issues an input/output request selectively to each of the disk groups 211.

From the viewpoint of the control unit 203, acceptable input/output processes from the processor 210 can be classified as follows:

(1) An input/output request process that does not gain access to a disk unit 214, which is a request for data transfer between the cache 206 and the processor 210. For example, the process executed when the data for a read request received from the processor 210 has already been staged in the cache 206 as shown by the cache directory 208.

(2) A process involving input/output request from a CPU requiring access to a disk unit 204 in a specified disk unit group 211.

(3) Execution process by the control unit 203 between a disk unit 204 and the cache 206, whereby the control unit 203 executes a subsequent input/output process independently of the input/output request received from the processor 210. For example, a data transfer without any relationship to the processor 210, which is an input output process between the cache 206 and a disk unit 204 in one of the disk unit groups 211.

The present invention relates to a load distribution control between the disk units 204 in the same disk unit group 211. Therefore, the input/output request process that does not gain access to a disk unit group 211 referred to as (1) above is not directly related to the present invention. Among the processes executed by the control unit 203, the processes mentioned above as (2) and (3) are the objects of the present invention. In this respect, the disk unit 204 to which no input/output process (2) or (3) mentioned above is assigned (that is, a disk unit not executing any process), is referred to as a disk unit in an inactive state.

The load distribution control of the first type according to the present invention will now be described along with all features that are common to the load distribution control of the second type according to the present invention.

Figure 1:
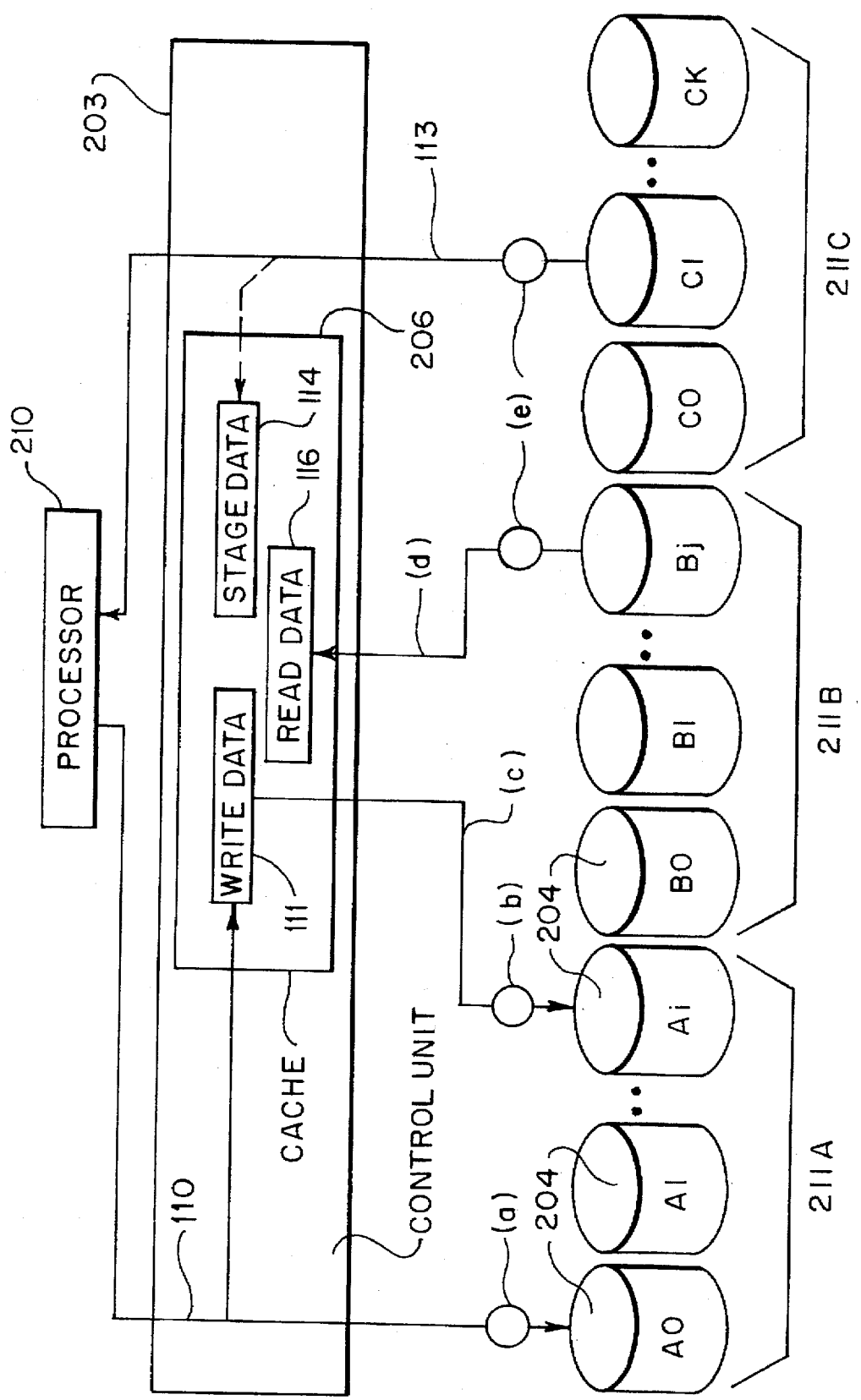
FIG. 1 illustrates the basic operation of a control unit with respect to a first kind of load distribution according to the present invention.

FIG. 1 is a block diagram illustrating the operation of the control unit 203 in accordance with the first type of distribution of the present invention. In FIG. 1, there are a plurality of master disk units, namely Ao, Bo and Co that are respectively a part of the disk unit groups 211A, 211B and 211C. The difference between the master disk unit and the other disk units is that the master disk unit is broadly a specific disk unit defined in advance in each of the disk unit groups 211 to more intensely receive the write requests, more specifically, to more intensely immediately receive the write data directly in accordance with a write request without passing the write data through the cache in a write after process, and even more specifically the master disk immediately receives the write data for all write requests to its disk unit group, whereas the other disk units of the same disk unit group receive the write data in a write after process from the cache.

In FIG. 1, the disk unit group 211A, the disk unit group 211B and the disk unit group 211C are connected to the control unit 203. The disk unit group 211A comprises a master disk unit Ao and a plurality of disk units A1 through Ai, which can vary in number from one to many disk units and which are disk units other than the specific unit, that is other than the master disk unit Ao. Likewise, the disk unit group B comprises a master disk unit Bo, and a plurality of other disk units B1 through Bj, and the disk unit group C comprises a master disk unit Co and other disk units C1 through Ck.

The input/output requests received by the control unit 203 from the processor 210 that require access to a disk unit 211 will be described separately for the write and read requests.

In FIG. 1, data flow 110 is for a write request, and data flow 113 is for a read request. The control unit 203 receives a write request 110 from the processor 210, which requires access to the disk unit group 211A. The control unit 203 selects the master disk Ao within the disk unit group 211A with selection (a). In other words, the master disk Ao is regarded as the disk unit in which the write requests which require an access to the disk unit group 211A are concentrated. According to the more limited aspect of the present invention, all of the write requests immediately transfer write data to the master disk Ao and the cache 206. The same write data is later transferred by the cache to all of the other disk units of the disk unit group 211A by the write after process. The control unit 203 writes to the master disk unit Ao the data of the write request received from the processor 210 and at the same time writes this write data to the cache 206 as write data 111. The control unit 203 later executes writing this same write data 111 to each of the disk units belonging to the same disk unit group 211A other than the master disk Ao, that is to the disk units A1 through Ai with selection (b) and write after process flow (c). The write data 111 is stored in the cache 206 until all of the write after processes to each of the disks A1 through Ai are completed.

In the case of receiving the write request which requires access to the disk unit group 211A, the reason why the master disk Ao is preferably always selected for immediately receiving the write data is as follows: If it is so arranged that any write request must necessarily be assigned to the master disk Ao, all write data 111 received from the processor 210 is written to the master disk Ao. As a result, the complete data is always held in the master disk Ao, even, if for example, there is a breakdown in any one of the disk units A1 through Ai other than the master disk and a power outage affecting the cache 206. However, this arrangement results in a restriction in selecting the disk unit freely for the write request received from the processor 210. Hence, the system performance is lowered as compared to a system wherein the write request can be allocated to an arbitrary disk unit in the requested disk unit group without specifying a master disk. That is, the present invention has an advantage over such a system with respect to reliability, but has a slightly reduced performance, e.g., speed. Specifically, in the present invention when the control unit 203 receives the write request 110 requiring access to the disk unit group 211A, the control unit cannot start its processing unless the master disk AO is inactive.

FIG. 1 also illustrates the case where the control unit 203 receives a read request from the processor 210 requiring access to the disk unit group 211C. At this time, the control unit 203 selects any one of the disk units 204 arbitrarily (including an algorithm within the control unit), among the disk units 204 that are in an inactive state within the disk unit group 211C, which in the example of FIG. 1 involves the selection (e) of disk unit 211C. The control unit 203 transfers the requested read data from the disk unit 211C to the processor 210 along the path 113. At this time, it may be arranged that the read data requested by the processor 210 is stored not only in the disk C1 but also staged in the cache 206 as stage data 114, and such storing is indicated by the broken line. By staging the data, a read request for the same data 114 at a later time can be executed from the cache at a higher speed than it can be executed from the disk unit group 211A.

As shown in FIG. 1, there are input/output processes between the disk unit groups and the cache 206 that are executed by the control unit 203 independently of the input/output request received from the processor 210. Specifically, there is the write after process involving data flow (c), which writes write data to the disk units in an independent stage process independently executed from the input/output request of the processor 210. Another example of the independent stage process performed separately from the processor 210 is the execution of an advanced read from the control unit 203 involving the inactive state disk unit selection process (e) and the advance read process (d). The write after process (c) is a process to write the write data 111 stored in the cache 206 to the disk unit selected as Ai, where no write data 111 has been written yet. There is no need of performing a write after process with respect to the master disk Ao in the disk unit group A because the write data 111 received from the processor 210 has already been directly written to the master disk unit Ao. Accordingly, with the exception of the master disk unit Ao, the write after process (b, c), is performed sequentially with respect to each of the other disk units, namely disk units A1 through Ai, with a sequence of execution not necessarily in that order. In the case where the control unit 203 executes a read ahead staging process (d, e) for a disk unit group 211B independently of the process at 210, the control unit 203 arbitrarily selects any one of the disk units in an inactive state among all of the disk units of the disk unit group 211B. In FIG. 1, the control unit 203 stages the stage data 114 in the cache 206 read from the disk Bj, by way of an example of the read ahead staging process.

For the write request received from the processor 210 that requires access to a disk unit group, the reliability is obscured by selecting the master disk for immediate writing of the write data. On the other hand, in the case of reading data from a disk unit group, any inactive disk unit, including the master disk unit, is selected for reading. This way, high reliability and high performance are realized in a well balanced manner according to the first type of load distribution of the present invention.

Figure 3:
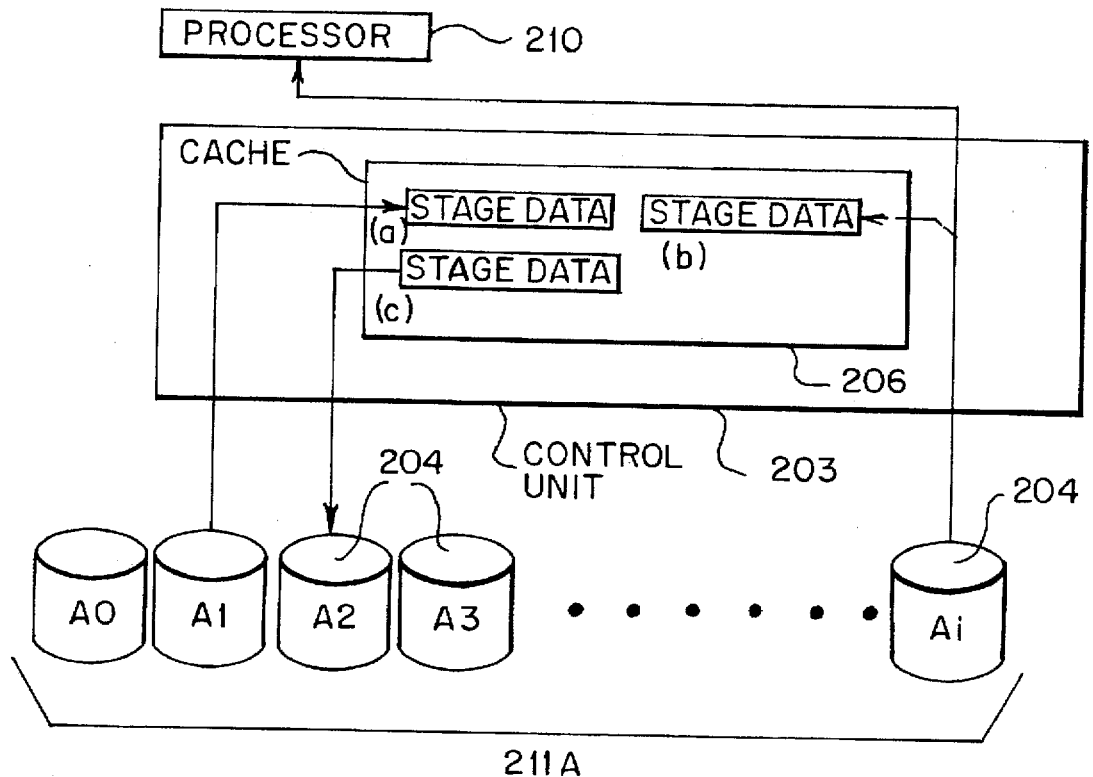
FIG. 3 shows parallel processing for an input/output process received from a processor and an input/output request executed by the control unit independently of the input output request from the processor.
Figure 4:
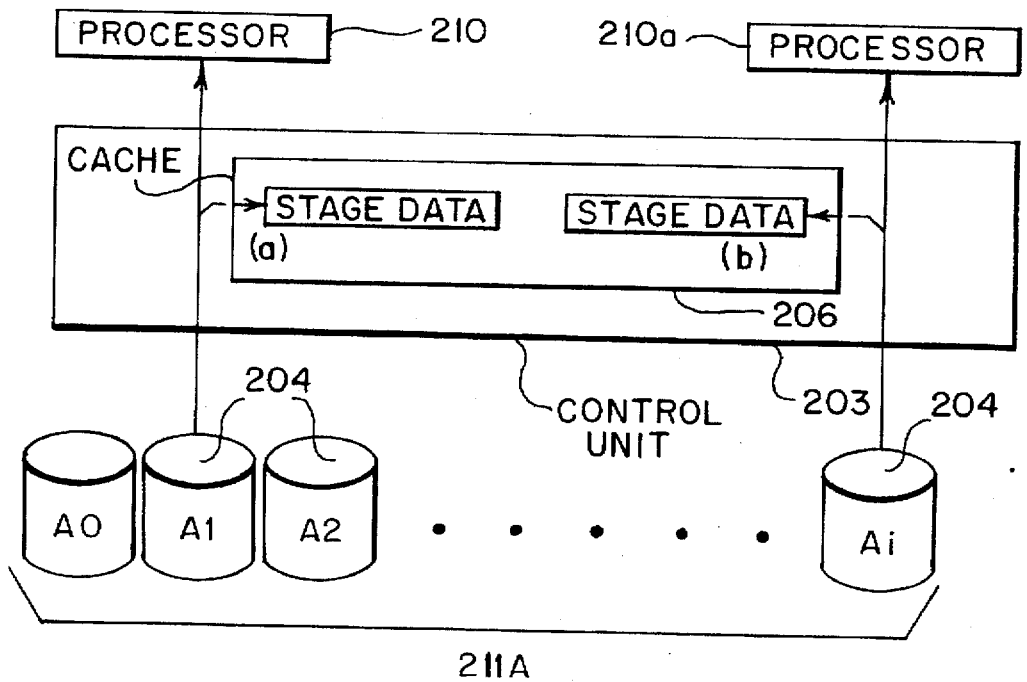
FIG. 4 shows parallel processing between a plurality of input output requests received respectfully from a plurality of processors.
Figure 5:
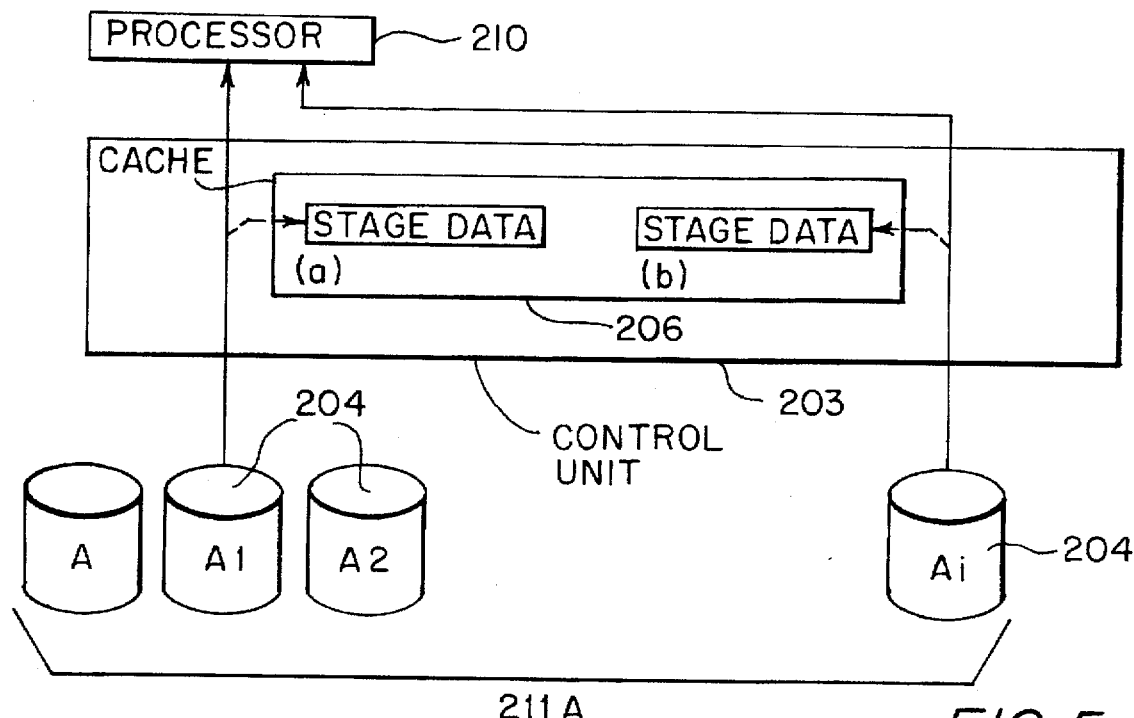
FIG. 5 shows parallel processing between a plurality of input output requests received from a single processor.

The present invention is particularly applicable to parallel processing, as shown with respect to different parallel processing examples set forth in FIGS. 3 through 5. Also, all of the processing shown in FIG. 1 is preferably parallel.

FIG. 3 illustrates the control unit 203 executing parallel processing for the input/output processes that are: a first process that requires access to the disk unit group A pursuant to a request from the processor 210; and a second process requiring execution by the control unit 203 and the cache 206 independently of the processor 210. As shown in FIG. 3, by way of example, the control unit 203 is parallel executing a stage process (a) with the disk unit A1 independently of an input/output process required by the processor 210, a write after process (c) between the control unit and the disk A2, and a read request (b) from the processor 210, all of which require access to the disk unit group 211A. In this case, the control unit 203 selects an inactive disk unit Ai in the disk unit group 211A so that it can start executing the read request that has been received from the processor. In FIG. 3, the write after process (c) and the read ahead stage process (a) are performed each independently of the processor 210 and are each executed in parallel processing with the other. However, if there are many inactive disk units, the control unit 203 can parallel execute the corresponding greater number of multiple write after processes and read ahead staging processes independently of the processor 210. However, it is impossible to perform a write request that requires the master disk unit Ao to be in an inactive state if some other process, for example a read process, is already being performed with respect to the master disk unit so that the master disk unit is not in an inactive state: this is a disadvantage of the first type of load distribution according to the present invention, which disadvantage is solved by the second type of load distribution of the present invention, as described hereinafter.

FIG. 4 and FIG. 5 illustrate parallel processing for plural read requests.

FIG. 4 shows a plurality of processors 210, each connected to a single control unit 203, and specifically shown are the processors 210 and 210a. By way of example, the control unit 203 receives from each of the processors 210 and 210a a read request that requires access to the disk unit group 211A. Then the control unit 203 arbitrarily selects an inactive disk unit for each, for example, disk unit A1 and Ai among the disk units of disk unit group 211A to start parallel processing the read requests that have been received, which processing may involve staging (b) of read data. As a matter of course, if there is any inactive disk in the disk unit group 211A when the control unit 203 receives the read request from the processor 210a, the read request is immediately executed. If the master disk is inactive, the write request is immediately executed. However, because of competition with respect to the master disk unit AO, it is impossible to parallel perform a plurality of write requests, each of which requests the disk unit group 211A. Also, if three or more processors are connected to the control unit 203, it is possible to perform parallel three or more read requests respectively from the three or more processors, where each request requires access to disk unit group 211A so long as there are at least three or more inactive disk units among the disk units 204 of disk unit group 211A.

FIG. 5 illustrates parallel processing with respect to one processor 210 connected to the control unit 203. The processor 210, by way of example, can issue a new input/output request to the disk unit group 211A before the current processing of the input/output request to the disk unit group 211A is completed. In FIG. 5, by way of example, the control unit 203 can be considered as in the middle of executing with respect to disk unit A1 a read request (a) received from the processor 210 that requires access to the disk unit group 211A. Before finishing this read request (a), the control unit 203 receives another read request (b) from the processor 210 that involves access to the same disk unit group 211A. The control unit 203 arbitrarily selects any one of the inactive disk units 204 of the disk unit group 211A, for example disk unit Ai, to start this second received read request (b) before the first read request (a) has been completely executed. Although not shown, the control unit 210 can also immediately start to process a write request that is received before the read requests (a) and (b) are completely executed, which write request requires access to the disk unit group 211A only if the master disk unit Ao is inactive. However, because of the competition for the master disk Ao, it is impossible to parallel execute a plurality of write requests that each require access to the same disk unit group, for example disk unit group 211A.

Furthermore, even in the case where the single processor 210 issues three or more input/output requests including one write request all specifying the disk unit group 211A, the control unit 203 can parallel execute the requests if in each case there is an inactive disk unit, with the write request requiring the master disk unit to be inactive.

Even though much of the following description of the first type of load distribution also relates to the second type of load distribution according to the present invention, the difference between the second type of load distribution and the first type of load distribution, each according to the present invention, will now be described. In the second type of distribution load, the read request from the processor requiring access to a specific disk unit group is executed with respect to any one of the inactive disk units other than the master disk unit. In a similar manner, a staging process that is performed independently of the processor 210 is executed with respect to any one of the inactive disk units other than the master disk unit.

The reason why the second type of load distribution according to the present invention differs only in this manner from the first type of load distribution according to the present invention is that selecting a disk unit other than the master disk unit 204 for processes other than the write request allows the processing to be executed at a higher speed than with the first type of load distribution. This is possible, because then there will be less conflict between a write request and a process other than the write request, because the write request involves only the master disk unit (the write after can be performed at a later time) and the processing other than the write request is executed preferably with respect to disk units other than the master disk unit, all of which increases the probability that parallel processing can be performed with less wait states. That is, according to the second type of load distribution according to the present invention, there is a higher possibility that the master disk is in an inactive state when the write request requiring access to the disk unit group is received, which increases the possibility of parallel processing and increases the speed of the process.

Figure 6:
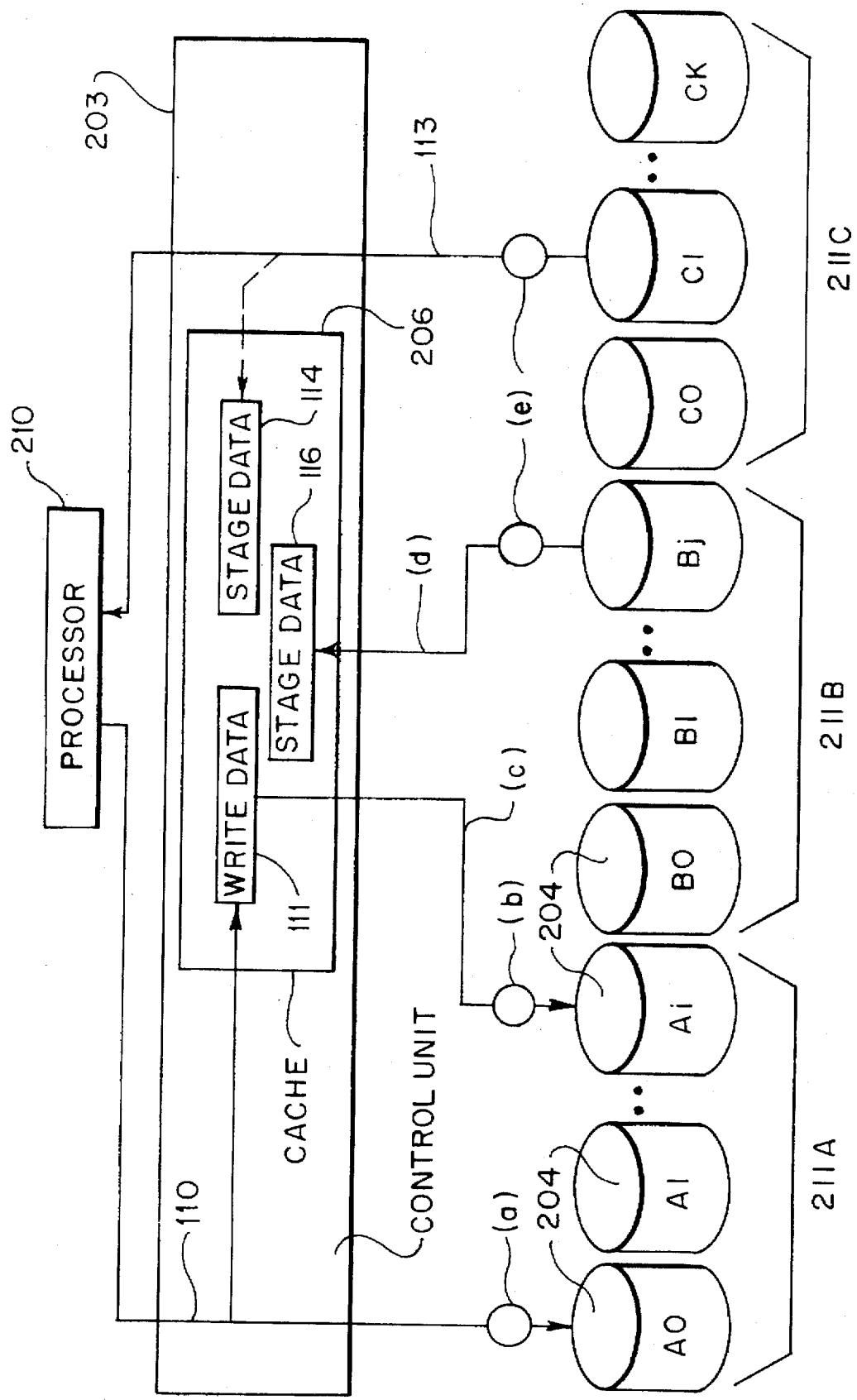
FIG. 6 illustrates the basic parallel operation of the control unit operating with respect to the second kind of load distribution, according to the present invention.

In FIG. 6, the following parallel processing is being accomplished as an example of the second type of load distribution according to the present invention. Write request 110 from the processor 210 requiring disk unit group 211A places write data 111 in the cache 206 of the control unit 203 and also performs master disk selection (a) to thereby place the same write data in the master disk unit Ao. At the same time (including overlapping but not coincided execution cycles), according to parallel processing, a read request 113 from the processor 210 requesting read data from the disk unit group 211C involves a selection (e) of disk unit C1 by the control unit 203 as an arbitrarily selected inactive disk unit among the disk units 204 other than the master disk unit Co to transfer read data to the processor 210 and as stage data 114 to the cache 206. Also according to parallel processing, staging conducting the read ahead process selects disk unit Bj by process (e) under control of control unit 203 to pass data along flow (d) to be stored in cache 206 as stage data 114. In parallel with the above or at a later time, the control unit 203 can perform select (b) of disk unit Ai for the write after of write data 111.

Unless otherwise indicated, the following description is applicable to both the first type and the second type of load distribution according to the present invention.

FIG. 8 illustrates the structure of a disk unit 204. A plurality of rotatably driven coaxial disks 801 are provided in the illustrated disk unit 204. A read/write head 802 is provided for reading and writing data for each of the disks 801 control unit interface 803 controls the operation, including movement, of the heads 802 with respect to the disks 801. A unit of recording medium for each of the disks 801 to which the read/write head 802 can gain access while the disk 801 completes one revolution is called a track 800. A plurality of tracks 800 are present on each disk 801.

FIG. 9 illustrates the structure of a single track 800. The track 800 has its track head 902 and track tail 903 defined at certain fixed positions, as references. Also, one or more records 900 can reside on each track 800. A record 900 is a minimum unit of input/output processing between the processor 210 and the control unit 203. The position of the record 900 on the track 800 is determined by a unit of fixed byte length called a cell 901. The storage of a record 900 must be started at a head of a cell 901 and it cannot be started from anywhere within the cell 901. Therefore the length of a record 900 is an integer multiple of the length of a cell 901. The numbering of the cells 901 is in ascending order, one by one, beginning with the track head 902 of the track 900 as number 0.

Figure 10:
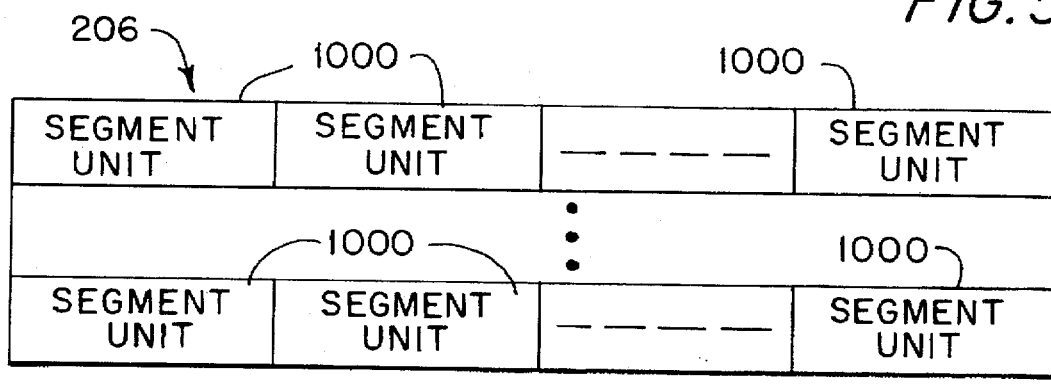
FIG. 10 illustrates the structure of a cache.

FIG. 10 illustrates the structure of the cache 206. The cache 206 may be DRAM or a portion thereof mapped to comprise segments 1000. In this embodiment, one segment 1000 is assigned to one track 800, and the entire data in each track 800 is stored in a corresponding segment 1000. However, according to the present invention, the assigned unit of the segment 1000 is not necessarily limited to the entire track 800. A smaller unit, such as a record, which is a read/write unit between the processor 210 and the control unit 203, can also be adopted freely as the assigned unit.

Figure 11:
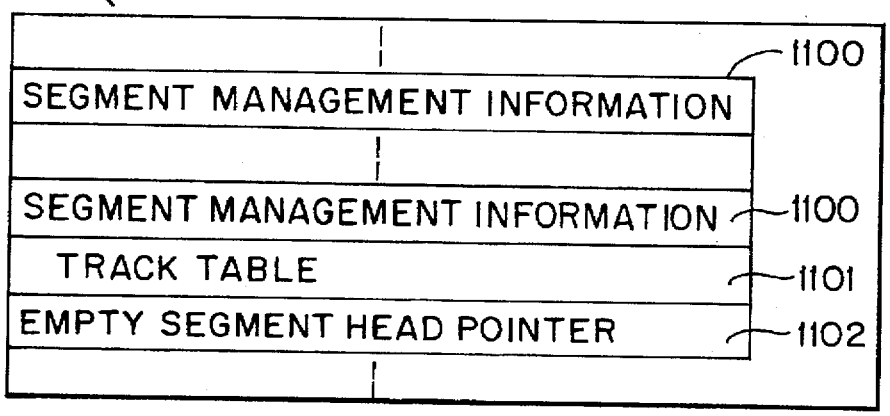
FIG. 11 shows the necessary information provided in a directory.

FIG. 11 illustrates the structure of the directory 208. The directory 208 comprises a plurality of segment management informations 1100, a track table 1101, and an empty segment head pointer 1102. Each segment management information 1100 resides in the segment unit 1000. Each one of the track tables 1101 and empty segment pointer 1102 resides in the control unit 203.

Figure 12:
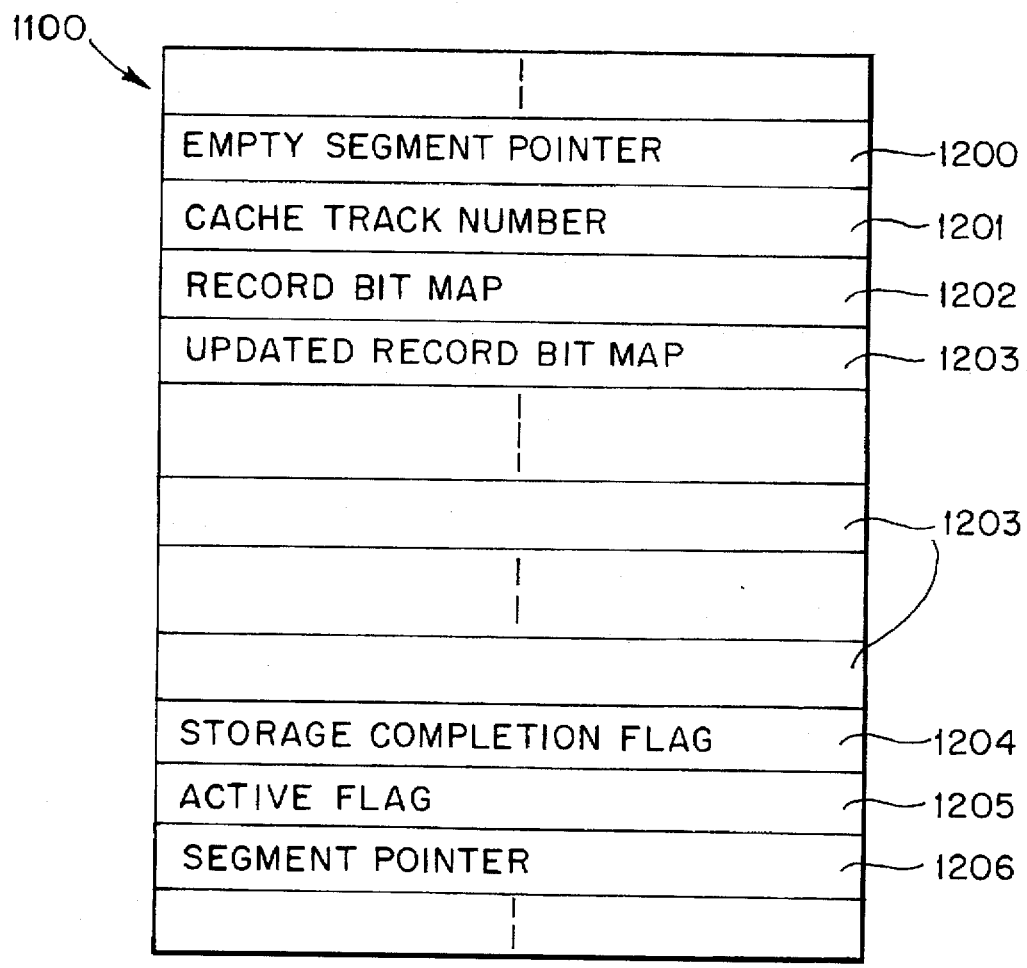
FIG. 12 shows the segment management information for the present invention.

FIG. 12 shows the required information for the present invention, which is provided in each segment management information 1100. An empty segment pointer 1200 indicates the segment unit 1000 which is not used in the track 800. A cache track number 1201 is the number of the track 800 of the disk unit group 211 stored in the segment unit 1000 for the corresponding segment management information 1100. The record bit map 1202 shows the starting position of a record 900 on the track 800 stored in the segment 1000 for the corresponding segment management information 1100. Here the bit position is in the corresponding number of the starting cell 901. If, for example, the nth bit in the record bit map 1202 is on, the storing of the corresponding record 900 is started at the nth cell 901, for the corresponding segment management information 1100. If the nth bit is off, a record 900 stored starting at the nth cell 901 does not exist.

Figure 13A:
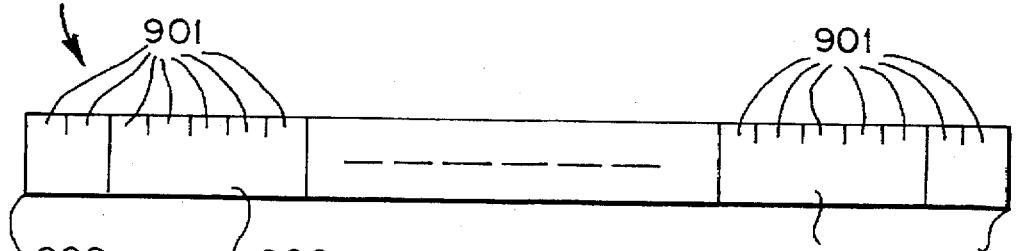
FIGS. 13a and 13b show the storage format for a record on a track in a segment unit.
Figure 13B:
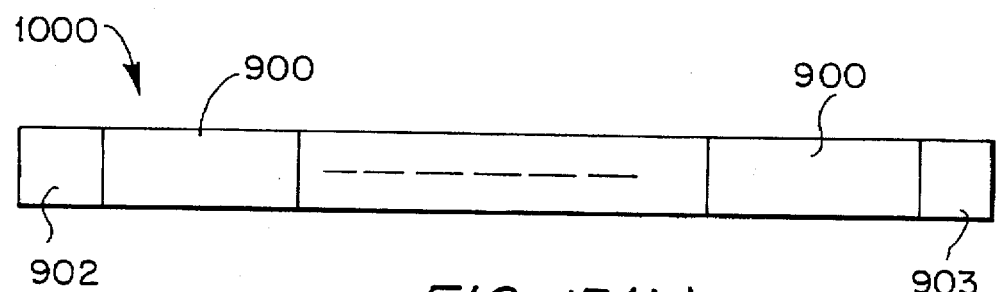

FIG. 13 illustrates the storing format of the data on the track 800 in the disk unit 204 for data also in the cache 206. The structure shown in FIG. 13a is the same as that of FIG. 9 that has already been described and which is also contained within the segment unit 1000. In the segment unit 1000, shown in FIG. 13b, the records 900 are sequentially recorded starting from the record at track head 902 on the track 800. Therefore, if the number of the cell 901 that stores the start of the record 900 on the track 800 is known, the storage starting position of the record 900 in the segment unit 1000 of the cache 206 is also known.

With respect to FIG. 12, partially described above, an updated record bit map 1203 for a record 900 is stored in the segment unit 1000 for the corresponding segment management information unit 1000, which requires a write after process. The record 900 that requires the write after process is hereinafter called a write after record. The respective bits reside in the corresponding number of the cell 901 as in the case of the record bit map 1202. Specifically, if the nth bit in the updated record bit map 1203 is on, the record 900, storing of which is started at the nth cell 901 for the corresponding segment management information 1100, is a write after record. A separate update record bit map 1203 is provided for each one of the disk units 204. The specific relationship between an updated record bit map 1203 and a disk unit 204 will be referred to when the structure of the control information memory 207 is described. The areas for the updated record bit map 1203 are prepared for the number of the disk units 204 that can be defined in one disk unit group 211. However, the number of the updated record bit maps 1203 that can be used is the number of the disk units 204 comprising the corresponding disk unit group.

In FIG. 12, the store completion flag 1204 shows whether or not the record 900 is stored on the assigned track 800 of the disk unit with respect to the record in the segment unit 1000 for the corresponding segment management information 1100. The active flag 1205 shows that the input output process is being executed for the track 800 assigned to the corresponding segment management information 1100. The segment pointer 1206 indicates a segment unit 1000 for the corresponding segment management information 1100.

Figure 14A:
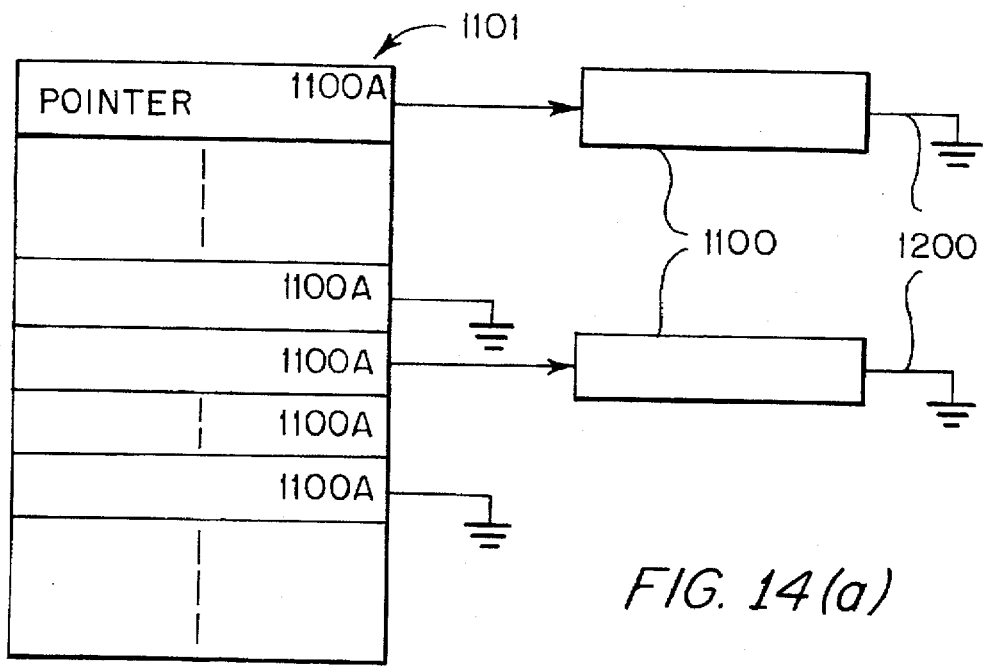
FIG. 14a illustrates the structure of a track table.
Figure 14B:
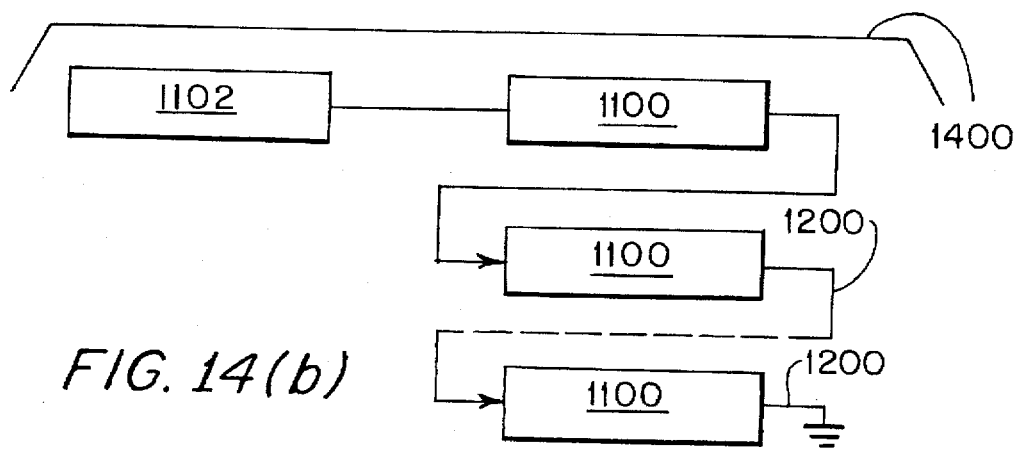
FIG. 14b illustrates the structure of an empty segment que headpointer.

FIG. 14a illustrates the structure of the track table 1101, and FIG. 14b indicates the structure of the inactive segment head pointer 1102.

The track table 1101 shows whether or not each of the segment units 1000 is assigned to a track 800, for a set of tracks 800 in the same disk unit group 211. A track table 1101 is provided for each of the disk unit groups 211. If assigned, a pointer 1100A is set to provide the address in memory where the segment management information is to be found. As shown for each of the segment units 1000 assigned to the track 800 if there is no segment management information 1100, 1200, the pointer is reset. The track table 1101 has the information regarding tracks 800 in the same disk unit group 211, all stored in the numerical order of the tracks 800, that is in ascending numerical order in the direction of the arrow shown in FIG. 14(a). The segment management information 1100 for the corresponding segment unit 1000 to which no track 800 has been assigned is all combined sequentially in storage at an address identified by the empty segment head pointer 1102. A set of the unassigned combined segment management information 1100 is called an empty segment que 1400 shown in FIG. 14(b).

Figure 15:
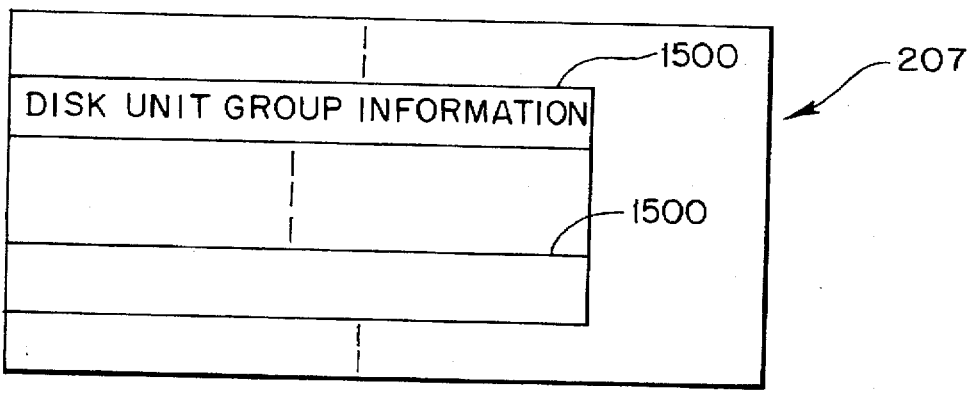
FIG. 15 shows the information stored in a control information memory.

FIG. 15 illustrates the structure of the control information memory 207. In the control information memory 207, disk unit group information 1500 is included, which has information for each disk unit group 211. The number of disk unit group informations 1500 corresponds to the number of the disk unit groups 211 that can be controlled by one control unit 203.

Figure 16:
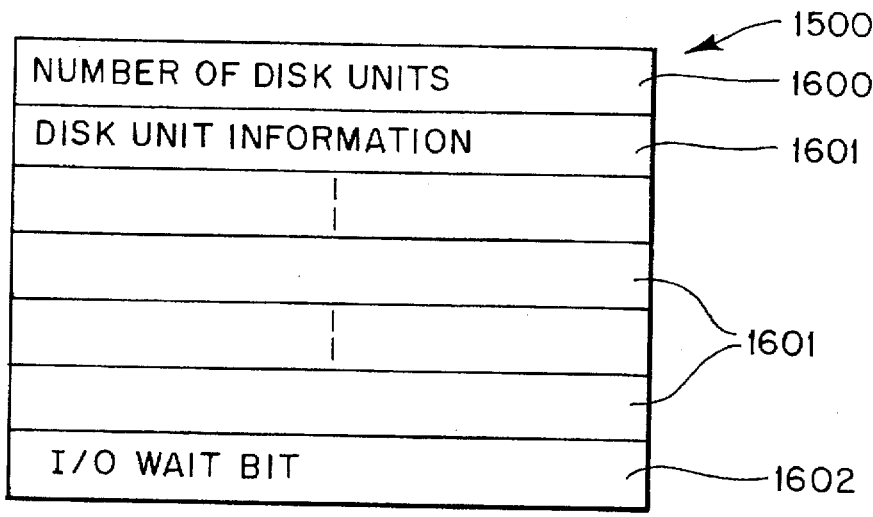
FIG. 16 illustrates the structure of a disk unit group information.

FIG. 16 illustrates the structure of one disk unit group information 1500, which is the same for all. Disk unit number 1600 is the number of the disk units 204 currently in the corresponding disk unit group 211. A plurality of the disk unit informations 1601 are provided, respectively for each of the disk units 204 comprising the corresponding disk unit group information 1500. The prepared number of disk unit informations 1601 is equal to the definable number of the disk units 204 defined in one disk unit group 211.

Effective information is stored from the first disk unit information head 1601 up to the number of the disk unit information 1601 defined by the disk unit number 1600. Here the disk unit information head 1601 is information for the master disk. Also, the nth updated record bit map 1203 of FIG. 12 in the segment management information 1200 is a disk unit 204 corresponding to the nth disk unit information 1601. A processor input/output wait bit 1602 shows that an input/output request received by the corresponding disk unit group 211 from the processor is in the wait state. This bit number can be expressed as follows. The number of the processor input/output wait bit 1602 equals the number of the processor 210 that can be connected to the control unit 203 (here the number is given as I) times the number of the input/output process requests, (here the number is given as J) that can be executed in parallel by one processor 210 for one disk unit group 211.

Therefore, when each processor 210 issues the input/output request to the control unit 203, the processor 210 sends the following two points of information to the control unit 203. A first point of information is the identity of the processor 210 that issues the input/output request, indicated by one of the numbers from 1 to I that are respectively assigned to the processor 210. The second point of information identifies for the specified disk unit group 211 the input/output requests by one of the numbers 1 to J.

Figure 17:
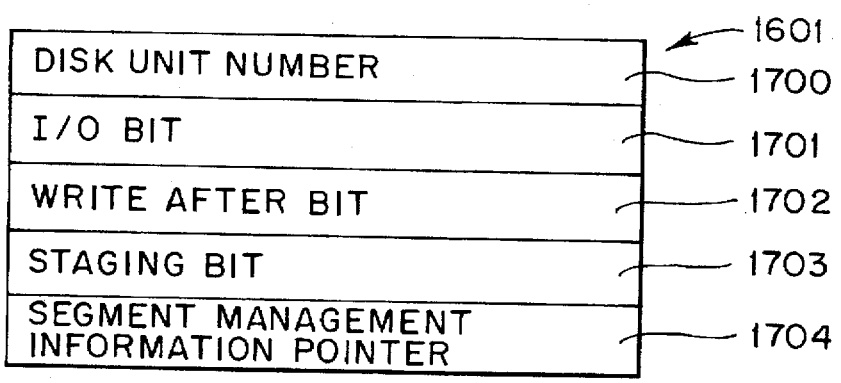
FIG. 17 illustrates the structure of a disk unit information.

FIG. 17 illustrates the structure of one of the disk unit informations 1601 and the others have the same structure. A disk unit number 1700 is given for identifying the disk unit 204 for the corresponding disk unit information 1601. A processor input/output execution single bit 1701 shows whether or not a disk unit 204 for the corresponding disk unit number 1700 is active in executing an input/output request received from the processor 210. A write after execution single bit 1702 shows whether or not a disk unit 204 for the corresponding disk unit number 1700 is active in executing a write after process. An independent staging execution single bit 1703 shows whether or not a disk unit 204 for the corresponding disk unit number 1700 is active in executing a staging process performed independently of the processor 210. For the processor input/output execution bit 1701, write after execution bit 1702 and independent stage execution bit 1703, only one may be set on at a single time. Also, a disk unit 204 for which the processor input/output execution bit 1701, write after execution bit 1702 and independent staging execution bit 1703 are off is a disk unit 204 in an inactive state. When one of these bits is on, the disk unit 204 is in an active state. Segment management information pointer 1704 indicates the address of the stored segment management information 1100 assigned to the track 800 accessed by an input/output process in execution by a disk unit 204 for the corresponding disk unit 1700. The segment management information pointer, when set, shows the address in storage for the segment management information for the disk unit 204 identified by disk unit number 1700.

It is desirable that the control information memory 207 is non-volatile, otherwise there is a problem that information stored in the control information memory 207 can be lost due to power outage and other reasons.

Input/output processes to be executed by the control unit 203 are actually carried out in parallel by the respective directors 204 in the control unit 203.

Figure 18:
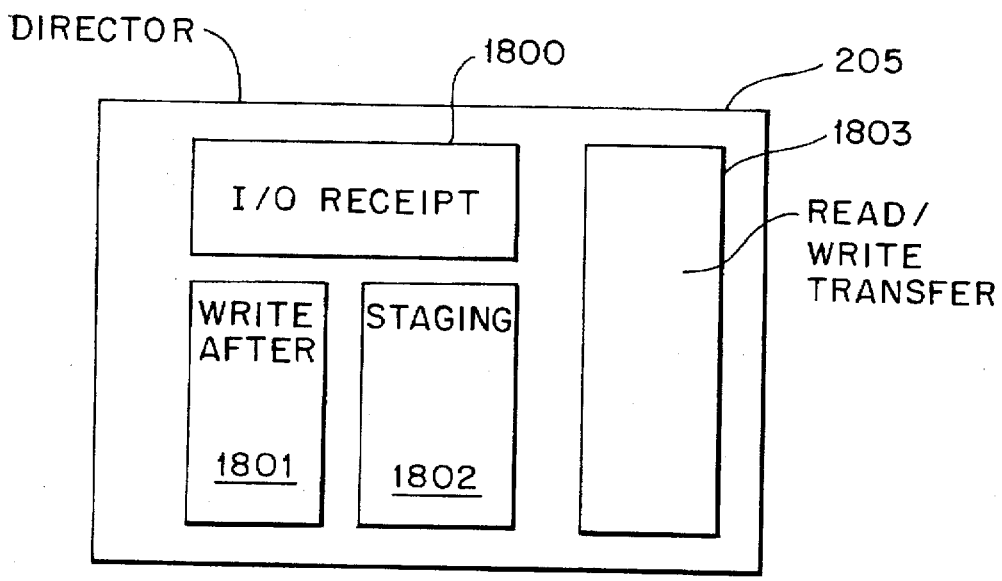
FIG. 18 illustrates the module of a director.

FIG. 18 shows each procedure used by each of the respective directors 204 for carrying out the required parallel executions according to the present invention. Each function of the procedures will be described. An input/output request receipt part 1800 processes the input/output request received from the processor 210. A write after process schedule part 1801 provides a schedule for the write after process. An independent stage process schedule part 1802 provides a schedule for the staging performed independently of the processor 210. A disk unit transfer part 1803 executes the read/write transfer to and from the disk units 204.

Figure 19:
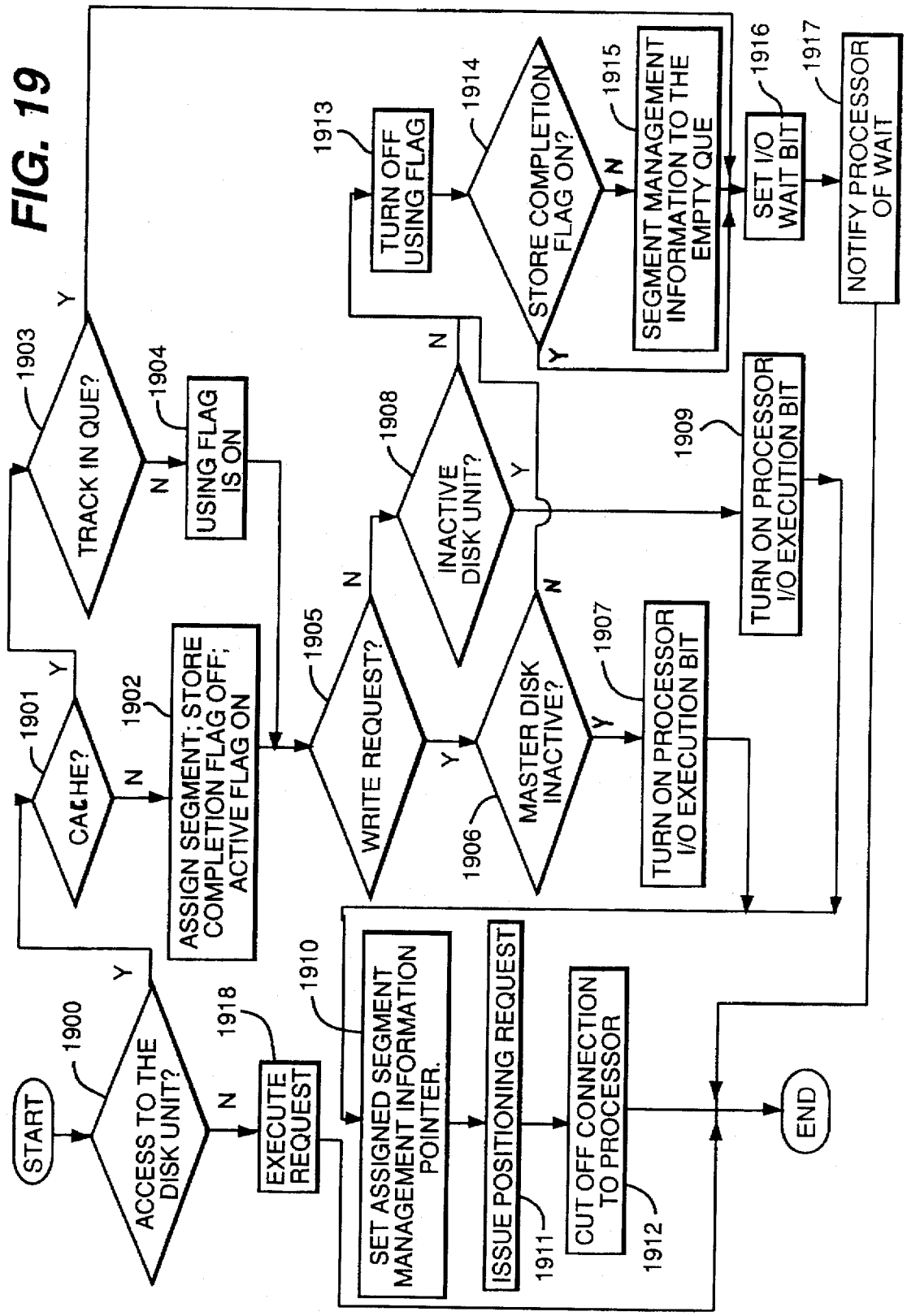
FIG. 19 is a flowchart for input/output request reception.

FIG. 19 is a flowchart for the input/output receipt part 1800 of FIG. 18. When the input/output receive part 1800 receives a new input/output request from the processor 210, this part starts its execution. The execution is as follows.

At step 1900, it is determined if an input/output request that has been received requires access to the disk unit 204. To specifically define the type of an input/output request which requires access to the disk unit 204 is not directly related to the present invention and therefore is omitted from the detailed description. If the input/output request received does not require access to the disk unit 204, the processing proceeds to the step 1918. If the answer to the determination in step 1900 is yes, step 1901 starts executing the input/output request by first determining if the requested input/output track resides in the cache. Specifically, a track 800 which the input/output request wishes to gain access to, is checked to determine whether or not a segment 1000 is assigned thereto. If an assignment is made, processing proceeds to step 1903. If no assignment is made as determined by step 1901, step 1902 assigns segment management information 1100 to the track 800 to which the input/output request wishes to gain access and links it to the corresponding area of the track table 1101. Also, the store completion flag 1204 for the assigned segment management information 1100 is turned off and the active flag 1205 is turned on. At this time, the segment management information 1100 of the assignment is one selected from the segment management information's 1100 that are in an inactive state starting at the empty segment head que 1102. If there is no segment management information 1100 in the inactive state, a segment management information currently assigned is selected by a known method. Any specific method of the selection is not related to the present invention and thus will not be described in detail. Following step 1902, step 1905 is executed.

If the determination in step 1901 is yes, step 1903 makes the determination if the requested input/output track is in use, that is the active flag 1205 for the segment management information 1100 assigned to the track 800 to which the input/output request gains access is checked to determine whether or not this flag 1205 is on. If it is on, the requested track 800 is in use for some other input/output process, therefore, the input/output request newly received cannot be executed immediately and hence processing proceeds to step 1916. If according to the determination in step 1903, it is found that the active flag 1205 is off, the active flag 1205 is turned on according to step 1904 and processing proceeds to step 1905.

In step 1905, it is determined if the input/output request is a write request. According to the most preferred form of the present invention, a write request which requires access to the disk unit group 211 gains access to only the master disk unit. Thus, if the input/output request is for reading, e.g., the processing branches conditionally to step 1908 in accordance with a negative determination from step 1905.

In the case of a write request, the master disk unit is checked at step 1906 to determine if the master disk unit in the requested disk unit group is inactive. This check examines the following information in the disk unit information 1601 for the corresponding master disk of the requested disk unit group 211, that is the head disk unit information 1601 in the disk unit group information 1500. In other words, the processor input/output execution bit 1701, write after execution bit 1702, and independent staging execution bit 1703 are all checked to determine if they are all inactive. Then, if the master disk is found to be in the inactive state, corresponding to none of the above-mentioned bits being set active, the requested master disk is selected according to step 1907. The selection is made in step 1907 by turning on the processor input/output execution bit 1701 in the disk unit information 1601 for the corresponding master disk. When the above process is completed, processing proceeds to step 1910 to start the same processing that is already described with respect to the first type of load distribution.

If the determination in step 1906 is that the requested master disk is active, processing proceeds to step 1913 where the corresponding input/output request is then kept in a wait state until it can be executed by turning off the active flag 1205.

If there is a negative determination from step 1905, that is if there is a read request, processing proceeds to step 1908. In step 1908, a determination is made if there is any inactive disk unit found in the requested disk unit group 211, to start the assignment of the read request which requires access to a disk unit 204 of the requested disk unit group 211. According to the first load distribution type of the present invention, an arbitrary disk unit which is in the inactive state is assigned to the request which requires access to a disk unit 204. Accordingly, the requested disk unit group 211 is checked to determine if there is an empty disk unit 204 therein in accordance with step 1908. The specific contents of the processing are as follows. In other words, with respect to the disk unit informations 1601 for the requested disk unit groups 211, the processor input/output execution bit 1701, write after execution bit 1702 and independent stage execution bit 1703 are searched to see if they are off. If any one of these bits is on for each of the searched disk units, it means that there is no inactive disk unit 204 in the requested disk unit groups 211, making it impossible to start executing the read process and therefore the answer to the determination in step 1908 is no and processing proceeds to step 1913 for the wait state until processing may be resumed.

If an inactive disk unit 204 is found in the requested disk unit group 211, corresponding to a yes determination from step 1908, an inactive disk unit 204 of the corresponding disk unit number 1700 in the corresponding disk unit information 1601 is selected by step 1909. Specifically, the processor input/output execution bit 1701 in the selected disk unit information 1601 thus found is turned on.

In step 1910, the selected segment management information pointer 1704 is set to indicate the segment management information 1100 assigned to the requested track 800. In step 1911, a positioning process request is issued for the disk unit 204 selected according to step 1909 to access the requested track 800 with its head. In step 1912, connection between the director 205 in use and the processor 210 making the request is cut off until the position process for the selected disk unit 204 is completed. Thereafter, the processing in the input receipt part 1800 is terminated.

As mentioned, step 1913 is conducted when no inactive disk unit 204 is found in the disk unit group 211 requested. In step 1913, the active flag 1205 from the corresponding segment management information 1100 is turned off. In accordance with step 1914, a determination is made if the store completion flag 1204 is on. If it is on, processing proceeds to step 1916. If the determination in step 1914 is no, the segment management information 1100 is registered in step 1915 in an empty segment que 1400 because the off value of the store completion flag 1205 indicates that no data is recorded in the segment 1000 corresponding to this segment management information 1100.

In step 1916, the corresponding input/output wait bit 1602 in the disk unit group information 1500 is set to provide an indication to the processor 210 that the process of the corresponding input/output request cannot be started due to some other input/output process being carried out. Specifically, the bit position to be set in the process request input/output wait bit 1602 is determined in view of the two points given below, and the setting of the bit is performed accordingly. A first point is to know the number of the processor 210 which issued the corresponding input/output request from those processors 210 numbered from 1 to I. A second point is to know subsequently the number of the input/output request from those numbered 1 to J issued to the disk unit group 210 specified by the input/output request.

In the case where the segment management information 1100 of the requested track 800, is being used by some other input/output request, it is not particularly necessary to manipulate the segment management information 1100. Finally, at step 1917, the requesting processor 210 is notified that the processing of the corresponding input/output request is in a wait state because the execution thereof cannot be started due to some other input/output process being executed. After this, the processing in the input/output receipt part 1800 is terminated.

If the answer to step 1900 is no, processing proceeds to step 1918. In step 1918, there is execution of a process required for the input/output request which does not require any access to the disk unit 204. The specific contents of this process is not directly related to the present invention therefore it is not described further in detail. Thereafter, the processing is ended.

Figure 20:
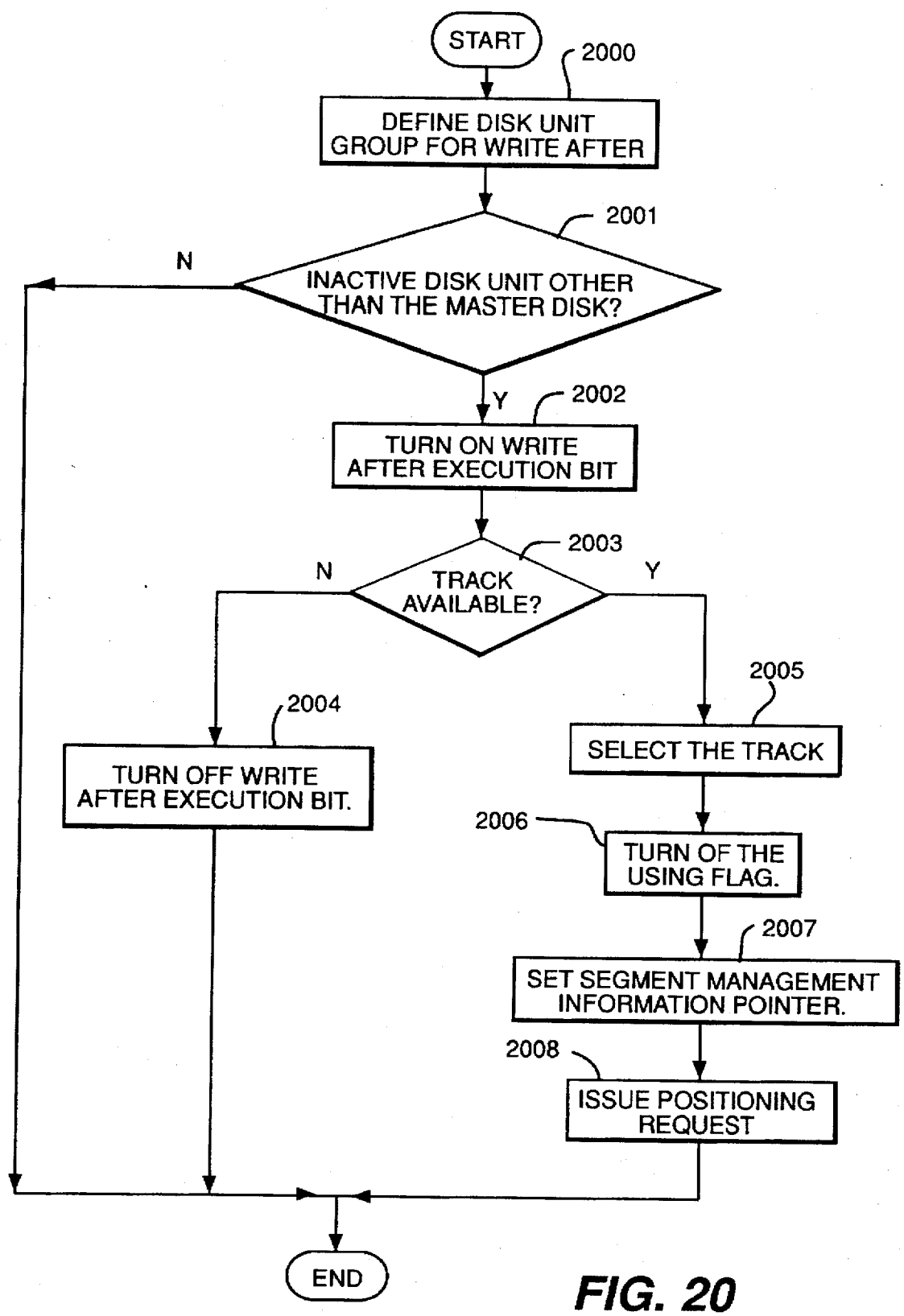
FIG. 20 is a flowchart for a write after processing.

FIG. 20 is a flowchart showing the write after process schedule part 1801. The right after process schedule part 1801 executes during a time the director 205 is inactive.

As shown in FIG. 20, step 2000 defines the disk unit group 210 for the write after. Because the method of this step is not directly related to the present invention, the detailed description thereof is omitted. In step 2001, a determination is made if there is an inactive disk unit 204 other than the master disk unit found in the requested disk unit group 211. The specific contents of the process of this step 2001 is given. With the exception of the master disk, a disk unit information 1601 in which the processor input/output execution bit 1701, write after execution bit 1702 and independent stage execution bit 1703 are all off is searched for. If it cannot be found, the negative result of seep 2001 indicates that the write after process cannot be executed and processing proceeds to the end and the right after process schedule part 1801 is terminated. If found, that is if there is an affirmative answer to step 2001, the write after execution bit 1702 in the disk unit information 1601 found with step 2001 is turned on with step 2002.

In step 2003, a determination is made if the disk unit 204 found in the step 2001 has any track 800 which can execute the write after process. The specific check information is the segment management information 1100 with the on-bit in the updated record map 1203 for disk unit 204 selected from the track table 1101. Also, it is necessary that such segment management information 1100 is not in use for some other process request. Thus, the active flag 1205 in the segment management information 1100 must be off. This is another condition required to execute the write after process. If the answer to the determination in step 2003 is no, step 2004 turns off the write after execution bit 1702 and the processing of the write after process schedule part 1801 is terminated. If the answer to the determination of step 2003 is yes, step 2005 will select the track 800 for the write after process. If there are a plurality of tracks 800 which can be used for executing the write after process, one must be selected. However, the selection of the track 800 among a plurality of such tracks is not related to the present invention and its description is omitted.

In step 2006, the active flag 1205 in the segment management information 1100 for the track 800 selected at the step 2005 is turned on. At step 2007, pointer 1704 to the segment management information 1100 assigned to the selected track 800 for the corresponding input/output request is set. At step 2008, a positioning process request is issued to the disk unit 204 selected at the step 2001. After this, the processing of the write after process schedule 1801 is terminated.

Figure 21:
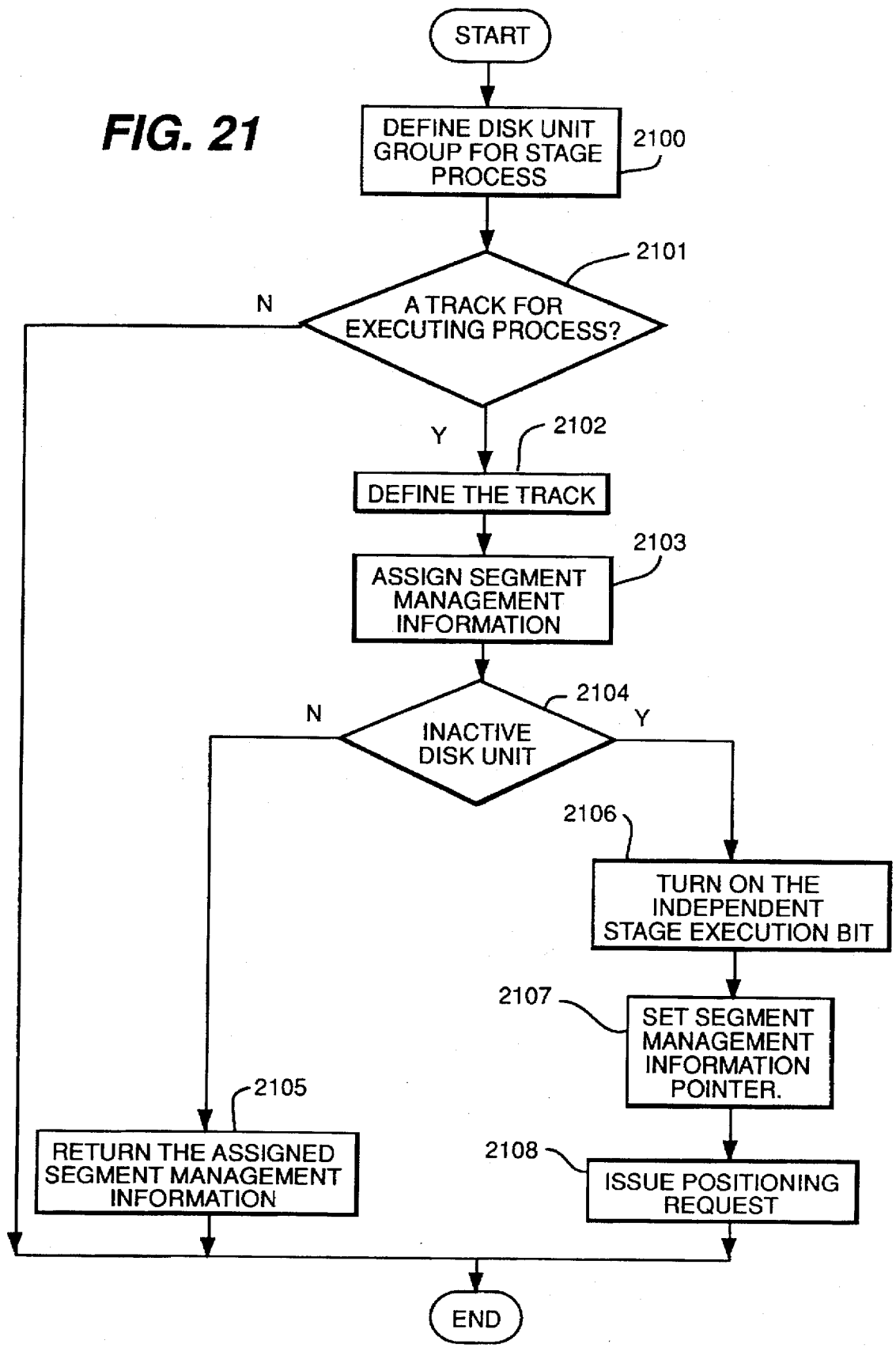
FIG. 21 is a flowchart for an independent staging.

FIG. 21 is a flowchart showing the independent stage process schedule part 1802, which executes during the time that the director 205 is in an inactive state. In step 2100, the disk unit group 211 which executes a stage process independently of the processor 210 is defined. This step is not directly related to the present invention and accordingly a specific description is omitted. In step 2101, a determination is made if the disk unit group 211 found in step 2100 has a track 800 for executing the staging independently of the processor 210. This step is not directly related to the present invention and therefore its specific description is omitted. If no track 800 is found in step 2101, the processing in the independent staging schedule part 1802 is terminated. If the answer to the determination of step 2101 is yes, step 2102 is performed. In step 2102, a track 800 is selected for the execution of the staging performed independently of the processor 210. If there are a plurality of tracks 800 that can be used to execute the stage process independently of the processor 210, a track 800 from among the plurality must be selected. However, the selection of a specific track 800 itself is not related to the present invention so that the specific description thereof is omitted.

In step 2103, a segment management information 1100 is assigned to the track 800 selected in the step 2102. The track 800 which should be used for executing the staging independently of the processor 210 is not a track 800 staged in the cache 206. This assignment method is the same as shown and described previously with respect to step 1902. Also, the store completion flag 1204 in the assigned segment management information 1100 is turned off; the active flag 1205 is turned on.

In step 2104, it is determined if there is a disk unit that is in the inactive state in the disk unit group defined in the step 2100 for the input/output processing. The specific processing for step 2104 is the same as that of step 1908 and hence a specific description thereof will be omitted. If the determination of step 2104 is negative, that is if no inactive state disk unit is found, it is impossible to execute the staging independently of the processor 210 and as a result the segment management information 1100 assigned at step 2103 is returned to the empty segment que 1400 and thereafter the processing in the independent stage process schedule 1802 is terminated. If the answer to the determination in step 2104 is yes, that is if an inactive disk unit is found, step 2106 is performed to turn on the independent stage execution bit 1702 in the disk information 1601 found at the step 2103.

In step 2107, a pointer 1704 to the segment management information 1100 assigned to the selected track 800 by the corresponding input/output request is set. In step 2108 a positioning process request is issued to the disk unit 204 selected in step 2100. Thereafter, the processing in the independent staging schedule 1802 is terminated.

Figure 22:
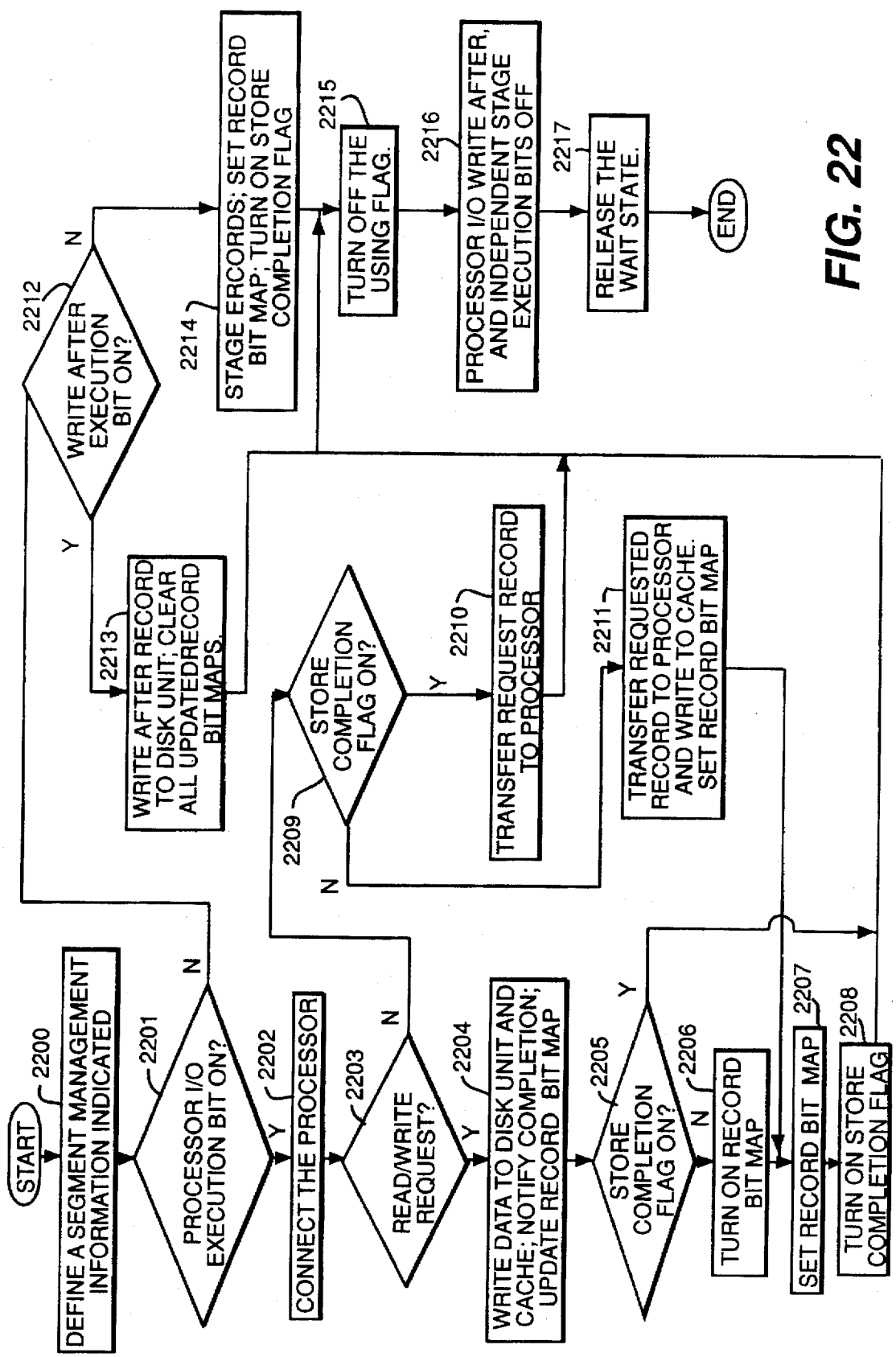
FIG. 22 is a flowchart for a disk unit read write process.

FIG. 22 is a flowchart for the disk unit read/write transfer part 1803 of FIG. 18. Execution by the disk read/write unit transfer part 1803 is started when the director 205 is informed that the positioning of the disk unit 204 is completed.

In step 2200, a segment management information 1100 pointed to by the segment management information pointer 1704 in the disk unit information 1601 for the corresponding disk unit 204 is selected. Hereinafter, a simple description of the segment management information 1100 means the segment management information 1100 selected at the step 2200 unless otherwise specified. Also, a simple description of the information in the segment management information 1100 means the information in the segment management information 1100 selected at the step 2200 unless otherwise specified.

In step 2201, a determination is made if the processor input/output execution bit 1701 in the disk information 1601 for the corresponding disk unit 204 is on. If the bit is not on, it indicates that the input/output process currently in execution is not a process for the input/output request received from the processor 210 and processing proceeds to step 2212. If the determination in step 2201 is yes, that is if the execution bit 1701 is on, it indicates that the input/output process currently in execution is the process for the input/output request received from the processor 210. Accordingly, in step 2202, the completion of positioning is communicated to the processor 210 and processing continues with connection of the control unit 203 to the processor.

In step 2203, a determination is made if the input/output request received from the processor is a write request. If the determination is no, that is, in the case of a read request, processing proceeds to step 2209.

In the case of a write request, the data is received from the processor 210 in step 2204 and written to the disk unit 204 and in the segment 1000 assigned to the corresponding segment management information 1100. However, the number of the cell 901 where the data in the request 1000 is to be written should be identified before the write execution described above starts, because the data to be written in the segment 1000 must be written at a position corresponding to the cell 901 thus identified. Further, the updated record bit map 1203 for all the disk units 204 other than the master disk unit in a segment management information 1100 is selected. In other words, the corresponding bit to the cell 901 identified as above in the updated record bit map 1203 is turned on. The write data received from the processor is also thereby written to the cache; thereafter, the completion of the input/output process is communicated to the processor 210.

In step 2205, a determination is made if the storing completion flag 1204 is on, by checking the corresponding segment management information 1100. If the determination is yes, processing proceeds to step 2215 because the records 900 on the processed track 800 are staged in the segment 1000. If the answer is no indicating that the storing completion flag 1204 is off, the record 900 from the process track 800 is not staged in the segment 1000. Consequently, the process proceeds to step 2206.

In step 2206, the bit position of the record bit map 1202 corresponding to the number of the cell 901 identified in step 2204 is turned on.

In step 2207, the remaining record 900 and the track 800 currently in execution to the segment 1000 is staged. In this case, it is also necessary to execute the following process while identifying the number of the cell 901 in the stage object record 900. First, the record 900 to be staged is also staged at a position corresponding to the identified cell 901 in the segment 1000. Also, the bit position of the record bit map 1202 corresponding to the number of the identified cell 901 is turned on. Then, with the storing completion flag 1'204 turned on in step 2208, the processing proceeds to step 2215.

Step 2209 is reached from a no determination in step 2203. In step 2209, a determination is made as a part of a read request received from the processor 210. In step 2209, it is determined if the store completion flag 1204 in the subject segment management information 1100 is on. If the determination in step 2209 is yes, processing proceeds to step 2210 to transfer the requested record 900 to the processor 210. The record 900 has already been stored in the segment 1000. Consequently, in step 2210 the requested record 900 in step 2210 is transferred from the disk unit 204 to the processor 210. Then the completion of the input/output process is communicated to the processor 210 and processing proceeds to step 2215.

If the determination in step 2209 is negative, that is if the store completion flag 1204 is off, the record 900 on the subject track 800 currently in execution is not staged in the segment 1000. Therefore, process step 2211 is executed. At step 2211, while being transferred to the processor 210 from the disk unit 204, the requested record 900 is staged in the segment 1000 of cache 206. Also, in step 2211, it is necessary to execute the process given below while identifying the number of a cell 901 of the stage record 900. First, the record 900 to be staged in a segment 1000 is also written at a position corresponding to the identified cell 901. Further, the bit for the corresponding number of the identified cell 901 in the record bit map 1202 in the selected segment management information 1100 is turned on. After this the completion of the input/output process is communicated in the processor 210. Subsequently, processing proceeds to step 2207, which has been described above, to stage the remaining record 900 in the subject track 800.

With the negative determination from step 2201, step 2212 is reached. In step 2212, it is determined if the write after execution bit 1702 in the disk unit information 1601 for the corresponding disk unit 204 is on. If the answer is no, that is if the bit is off, the processing proceeds to step 1214 to execute the stage process independently of the processor 210. In step 2214, all the records on the track are staged to the cache and the corresponding record bit map is set and the storage completion flag is turned on.

If the determination in step 2212 is yes, step 2213 will write the write after record to the disk unit. All the identified write after records are identified by the subject bit map 1203 in the defined segment management information 1100. After this, the entire updated record bit map 1203 for the corresponding disk unit 204 is cleared, that is set to 0. Subsequently, the processing proceeds to step 2215.

In step 2214 reached with a no answer from steps 2212, the stage process is executed independently of the processor 210. Specifically, all the records 900 on the subject track 800 are staged in the segment 1000 of the cache. It is also necessary to execute the following process while identifying the number of the cell 901 in the stage record 900. First the record 900 to be staged in the segment 1000 is also written at a position corresponding to the identified cell 901. Further, the following process is performed for the record bit map 1202 in the subject segment management information 1100. In other words, the bit position of the record bit map 1202 corresponding to the identified cell 901 is turned on. In addition, the store completion flat 1204 is turned on.

The termination process proceeds from step 2215. In step 2215, reached from various other steps 2214, 2213, a yes answer from step 2205, and step 2208. In step 2215, the active flag 1205 in the subject segment management information 1100 is turned off.

In step 2216 all the bits in the process I/O execution bit 1701, write after execution bits 1702 and independent stage execution bit 1703 in the disk unit information 1601 for the corresponding disk unit 204 are turned off, which will show the inactive state for the disk unit 204.

Finally, in step 2217, the following process is executed to release the wait state of the input/output request for which the processor wait bit 1602 for the corresponding disk unit group 211 is on. In other words, the waiting states of all of the input/output requests defined by the processor 210 numbered 1 to I and the input/output request numbers of 1 to J according to the bits being turned on are released. Specifically, each of the processors is notified to issue its input/output request. In summary, a search is made against the input/output wait bit of the input/output request which is in a wait state for the corresponding disk unit group and the wait state is released. After this, the processing in the disk unit transfer part 1802 is terminated.

As mentioned previously, the second type of load distribution according to the present invention is the same as the above-described first type, except for specifically mentioned differences. Some of these differences are given below. In the second type of load distribution, according to the present invention, a disk unit 204 other than the master disk is preferably selected for the read request requiring access to the disk unit group 211 and the staging is performed independently of the processor 210. The respective data structure shown in FIGS. 8 through 17 are adapted to the second type of load distribution without any change even though they were described with respect to the first type of load distribution. The modular structure shown in FIG. 18 that is necessary for executing the first type load distribution in director 205 can be adapted for the second type of load distribution as it is. Although the respective process flow of the modules in the input/output request receive part 1800 and the independent stage process schedule part 1802 are slightly different from those in the first type of load distribution, the process flow in the first type of load distribution for the other modular process is applicable without modification to the second type of load distribution.

Figure 23:
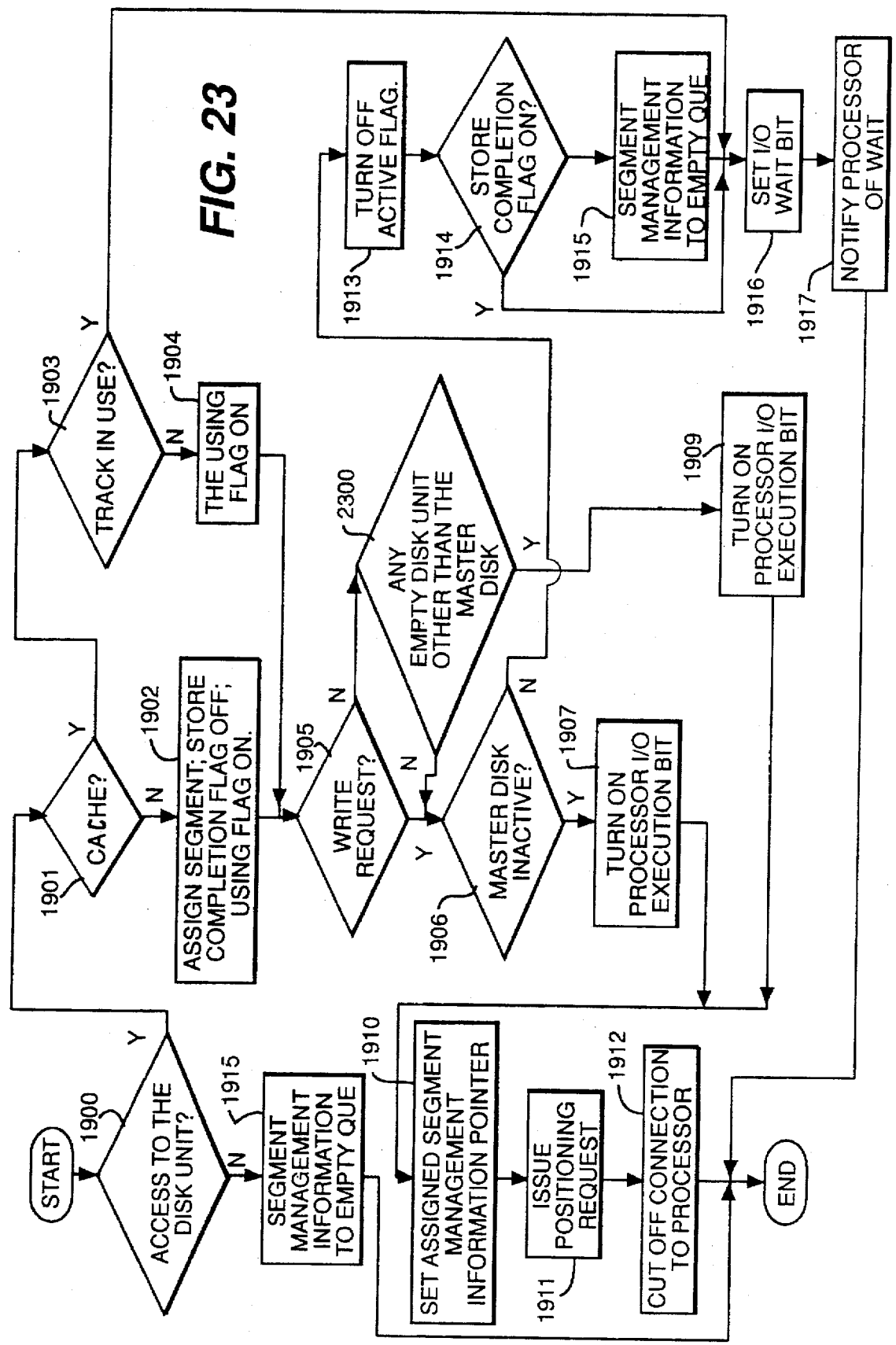
FIG. 23 is a flowchart for an input/output request reception according to the second kind of load distribution of the present invention.

FIG. 23 is a flowchart showing the input/output request receive part 1800 in the second type of load distribution of the present invention. The execution of the input/output request receive part 1800 is started as in the case of the previously described first type of load distribution. Therefore, only the difference between the flowchart of FIG. 19 of the first load distribution type and the flowchart of FIG. 23 of the second load distribution type will be described, and the similarities will not be repeated. In this respect, the step numbers are identical where the contents of the process steps in FIG. 23 are exactly the same as those in the process steps in FIG. 19. The difference in the process flow of the flowchart of FIG. 23 and that of FIG. 19 is that a step 2300 is adopted in FIG. 23 instead of the step 1908 in FIG. 19.

In step 2300, a determination is made if any inactive disk unit other than the master disk is found. In step 2300, the selection is preferably made to determine if the disk unit 204 other than the master disk is in an inactive state. This is because the second type of load distribution, for a read request requiring access to the disk unit group 211, selects a disk unit 204 other than the master disk. Specifically, the following information in the disk unit information 1601 for each disk unit 204 other than the master disk is checked. In other words, the processor input/output execution bit 1701, write after execution bit 1702 and independent stage execution bit 1703 are checked to determine whether all the bits are off, for those disk units other than the master disk unit. If there is an inactive disk unit 204, a yes determination from step 2300, processing proceeds to step 1909 to select such disk unit 204, and then the same process as described with respect to FIG. 19 proceeds. If there is no inactive disk unit 204, that is if the answer to the determination of step 2300 is no, the processing proceeds to step 1906 to check whether the master disk is inactive, and the processing follows the process flow already shown and described with respect to FIG. 19.

With the exception of the points given above, the process of FIG. 23 is exactly the same as that shown in FIG. 19 and the description thereof is omitted.

Figure 7:
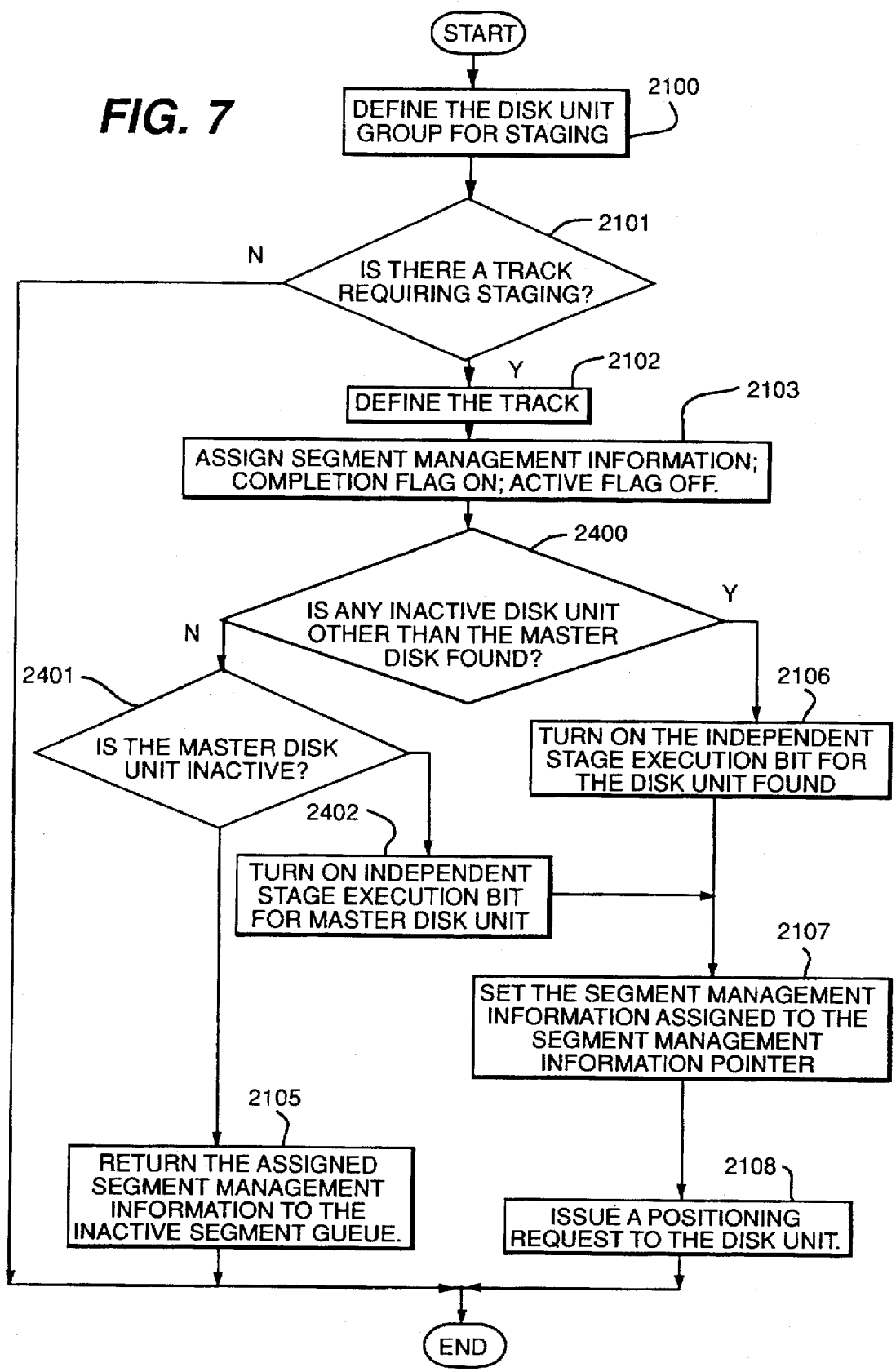
FIG. 7 is a flowchart showing independent staging with respect to the second kind of load distribution according to the present invention.

FIG. 7 is the flowchart of the independent stage process schedule part 1802 with respect to the second type of load distribution of the present invention. The execution of the independent stage process schedule part 1802 for the second type of load distribution is started the same as in the case of the first type of load distribution, already described. Subsequently, the difference between the process flow shown in FIG. 21 with respect to the first distribution load and the process flow shown in FIG. 7 will be described. In this respect, the step numbers are identical where the contents of processes and the process flow of FIG. 7 are exactly the same as those of the process flow in FIG. 21.

The process flow in FIG. 7 differs from that in FIG. 21 in the following points. First, when an inactive disk unit 204 is to be found subsequently to the step 2102, an inactive disk unit 204 other than the master disk is found in the step 2400 in the case of the second type of load distribution according to the present invention. This is because of the preferred selection of the disk unit 204 other than the master disk unit in the second type of load distribution for the stage process performed independently of the processor 210. The specific process is the same as that for step 2300 and the description thereof is omitted. If there is an inactive disk 204, the processing proceeds to step 2104 to select such inactive disk unit 204, and the same process as in the first type of load distribution starts. If the disk unit 204 other than the master disk unit is not in an inactive state, the master disk unit is checked in step 2401 to determine if it is inactive. The above process is the same as the process in step 1906 and therefore the description thereof is omitted. If the master disk unit is inactive, the master disk unit is selected in step 2402. Specifically, the processor input/output execution bit 1701 in the disk unit information 1601 for the corresponding master disk is turned on. After this, the processing proceeds to step 2107 to start the same processing as already explained with respect to the first type of load distribution. If the master disk unit is not inactive, that is if it is active, the staging process performed independently of the processor 210 cannot be executed. Hence, the processing proceeds to step 2105 to start the same process as already explained with respect to the first type of load distribution. With the exception of the above points, the process flow in FIG. 7 and the process flow in FIG. 21 are exactly the same, and the description of these same parts will not be duplicated.

According to the present invention, it is possible to obtain a well balanced high performance and high reliability of a control unit with a cache having a function of writing the same data into all of the plurality of separate storages of a disk unit group comprising one or more disk units. This is because of the achievement of the distribution of an input/output process between the disk units within a limit not losing any reliability and the improvement of the performance of an input/output process executable by the control unit brought about by the present invention.

While a preferred embodiment has been set forth along with modifications and variations to show specific advantageous details of the present invention, further embodiments, modifications and variations are contemplated within the broader aspects of the present invention, all as set forth by the spirit and scope of the following claims.

We claim:

1. A control unit for processing input/output processes for a disk unit group of a master disk unit and other disk units, the disk unit group being operable under the control of a processor issuing read/write requests to the control unit for the disk unit group, said control unit comprising:

write means for processing a write request from the processor to the disk unit group for always writing write data of any write request from the processor to the master disk unit of the disk unit group;

after write means for thereafter writing the same write data to all the other disk units of the disk unit group;

read means for processing a read request from the processor to the disk unit group for reading read data from any one of the disk units of the disk unit group that is selected by the control unit, and transferring the read data to the processor; and wherein each of said after write means and said read means examines an active/inactive state of the disk units and selects only an inactive one of the other disk units for the reading and transferring as a first priority and upon determining the active state for all the other disk units, then examines an active/inactive state of the master disk unit to complete the reading and transferring with respect to the master disk unit when the master disk is in an inactive state as a second priority and to place the reading and transferring in a wait state when the master disk unit is in an active state.

2. The control unit of claim 1, including:

a cache; and staging means for stage processing reading and writing between the cache and any disk unit of the disk unit group independently of the processor.

3. The control unit of claim 2, wherein said staging means includes read ahead means for performing a read ahead process transferring read data from a disk unit of said disk unit group to the cache independently of a current I/O request and in parallel with the writing, reading and transferring of said write, after write and read means.

4. The control unit of claim 1, including means for parallel processing the writing, reading and transferring of said write, after write and read means.

5. The control unit of claim 1, wherein each of said means examines an active/inactive state of the disk units and selects only an inactive state disk unit for respective writing, reading and transferring.

6. The control unit of claim 1, in combination with a plurality of the disk unit groups, with each disk unit group having a master disk and at least one other disk unit; and said write, after write and read means being inoperative for parallel processing with respect to each disk unit group.

7. The control unit of claim 6, wherein each disk unit group has a plurality of other disk units.

8. The control unit of claim 1, in combination with a plurality of processors, all of said write, after write and read means parallel processing read/write requests from the processors.

9. The control unit of claim 1, wherein each disk unit includes a plurality of rotatably mounted coaxial disks, at least one transducing head associated with each of the disks and movable relative to the disks for transducing the associated disk under control of said write, after write and read means.

10. The control unit of claim 1, wherein said after write means includes a cache memory, writes the write data in the cache memory, reports completion of the write request to the processor, and thereafter writes the write data to the disk units other than the master disk unit.

11. A controller method for control of storage with respect to at least one storage group having plural storage units, comprising:

selecting one of the storage units for a write request for the storage group received from a processor and completing the write request with respect to the one of the storage units; and selecting a different one of the storage units with respect to said one storage unit as a read unit for a read request made to the storage group from the processor with said second mentioned selecting being based upon criteria that the read unit is arbitrary with respect to the read request and is an inactive storage unit, and completing the read request with respect to the read unit so that said second mentioned selecting and completing of the read request are parallel processed with respect to said first mentioned selecting and completing of the write request.

12. The method of claim 11, wherein said step of selecting for the read request has the further criteria that the selection is only made among the storage units in the storage group other than a specific storage unit having a fixed location within the storage group.

13. A method for load distribution control of storage with respect to at least one storage group having a plurality of storage units, comprising:

selecting a specific storage unit having a fixed location within the storage group for all write requests to the one storage group, based upon a selection criteria that the specific storage unit is inactive;

completing the write request with respect to the selected specific storage unit by writing write data to the selected specific storage unit;

reporting completion of the write request and thereafter writing the same write data to storage units of the one storage group other than the specific storage unit;

selecting an arbitrary storage unit for read requests to the one storage group, with said selecting being independent of the read request and based upon criteria that the selected arbitrary storage unit is inactive and a part of the storage group identified by the read request from the processor, and completing the read request with respect to the selected arbitrary storage unit; and wherein said step of selecting for the read request further requires that the selection be made only among the storage units in the storage group other than the specific storage unit.

14. A method according to claim 13, including selecting the specific storage unit based upon satisfaction of the criteria that the selected specific storage unit is inactive and selected only after all of the other storage units have been found to be active in said selecting an arbitrary storage unit, and thereafter completing the read request with respect to the selected specific storage unit.

15. A controller method for control of storage with respect to at least one storage group having one storage unit and plural other storage units, comprising:

always selecting only the one storage unit for a write request received from a processor for the storage group and completing the write request with respect to the selected one storage unit, and selecting an arbitrary storage unit for a read request made to the storage group from the processor with said selecting being based upon criteria that the selected arbitrary storage unit is arbitrary with respect to the processor read request and is an inactive storage unit, and completing the read request with respect to the selected arbitrary storage unit.

16. A load distribution controller of storage with respect to at least one storage group having a plurality of storage units, comprising:

means for selecting one storage unit, arbitrarily with respect to an input/output read request, with selection criteria being that the one storage unit is a storage unit other than a specific storage unit having a fixed location in the storage group and that the one storage unit is inactive; and means for thereafter completing the read request with respect to the one storage unit.

17. The controller according to claim 16, including means for selecting the specific storage unit based upon satisfaction of criteria that the specific storage unit is inactive and selected only after all of the other storage units have been found to be active, and thereafter completing the read request with respect to the specific storage unit.

18. A load distribution controller of storage with respect to at least one storage group having a specific storage unit and a plurality of other storage units comprising:

means for selecting the specific storage unit having a fixed location within the one storage group for all write requests to the one storage group, based upon selection criteria that the specific storage unit is inactive;

means for completing the write requests by writing write data to the specific storage unit;

means for reporting completion of the write requests and thereafter writing the same write data to the other storage units; and means for selecting an arbitrary storage unit that differs from said specific storage unit for a read request to the one storage group, with said selecting being independent of the read request and based upon criteria that the arbitrary storage unit is inactive and a part of the storage group identified by the read request from the processor, and completing the read request with respect to the arbitrary storage unit.

19. A disk storage system, comprising:

a disk unit group including a plurality of disk units, each being means for storing identical data;

write means for writing write data into a predetermined one disk unit of said disk unit group in response to a write request from a processor;

after write means for writing the write data into each of said disk units other than said predetermined one disk unit after said write means wrote the write data into said predetermined one disk unit;

means for selecting an arbitrary one of said disk units from disk units of said disk unit group other than said predetermined one disk unit in response to a read request from the processor; and read means for reading read data, requested in the read request, from said arbitrary one of said disk units and transferring the read data to the processor.

20. A disk storage system according to claim 19, wherein said means for selecting selects a plurality of arbitrary disk units from said disk unit group corresponding to a plurality of read requests from the processor and said read means reading corresponding read data from said plurality of arbitrary disk units in parallel.

21. A disk storage system according to claim 20, wherein said means for selecting selects said arbitrary one of said disk units from disk units of said disk unit group other than said predetermined one disk unit.

22. A disk storage system according to claim 19, further comprising:

a cache storage; and prefetch means for transferring prefetch data from the arbitrary one of said disk units to said cache storage independently of the processor issuing a read request identifying the prefetch data.

23. A disk storage system according to claim 22, wherein said read means reads read data requested in said read requests from said cache storage when said read data exist in said cache storage.

24. A control method of claim 23, wherein said reading step includes reading a plurality of different read data from corresponding plurality of different selected ones of the disk units in parallel in response to a corresponding plurality of received read requests.

25. A control method of claim 23, wherein:

said selecting selects independently of the processor issuing the read request to obtain prefetch data, and wherein said reading and transferring stores the prefetch data in the cache storage.

26. A control method of claim 25, wherein said reading step includes reading read data from the cache storage instead of read data stored in the disk unit group when requested read data exists in the cache storage.

27. A control method of a disk storage system including a disk unit group having a plurality of disk units, each of which stores identical data, and a cache storage for storing a part of the data stored in the disk unit group, said method comprising the steps of:

receiving write data from a processor;

writing the write data into a master disk unit of the disk unit group;

thereafter writing the write data to all disk units of the disk unit group other than the master disk unit;

receiving at least one read request from the processor;

selecting at least one of the disk units in response to the read request; and reading read data requested in the read request from the one of the disk units other than said master disk unit and transferring the read data to the processor.

28. A disk storage system comprising:

a disk unit group including a master disk unit and a plurality of other disk units, each for storing identical data;

a cache storage for storing a part of the data stored in said disk unit group;

write means for writing write data into the master disk unit in response to a write request issued by a processor;

after write means for writing the write data into all of said other disk units after said write means wrote the write data into said master disk unit;

means for selecting at least one arbitrary disk unit from among the other disk units of said disk unit group other than said master disk unit in response to receipt of and independently of the content of a read request issued by the processor;

prefetch means for transferring read data from the arbitrary disk unit to said cache storage; and read means for reading the read data from said cache storage corresponding to a read request when the read data exists in said cache storage.

29. A disk storage system according to claim 28, wherein said means for selecting selects a plurality of arbitrary disk units and said prefetch means transfers a plurality of read data from the selected plurality of arbitrary disk units to said cache storage in parallel.

30. A control unit for processing read/write processes for a disk unit group, which includes a master disk unit and other disk units, and for operating in response to read/write requests issued by a processor to the disk unit group, said control unit comprising:

write means for writing to the master disk write data, received from the processor in a write request issued to the disk unit group;

after write means for writing the write data to all the other disk units after said write means wrote the write data to the master disk unit; and read means for transferring to the processor read data requested by the processor in a read request issued to the disk unit group, from an arbitrary disk unit in the disk unit group other than said master disk unit.

31. The control unit of claim 30, further including multi read request receiving means for receiving at least two read requests prior to executing one of the at least two read requests;

multi read disk unit select means for selecting at least two disk units from the disk unit group, corresponding in quantity to the number of the at least two read requests; and multi read means for transferring read data requested in the at least two read requests, from the at least two disk units in parallel.

32. A control unit for processing read/write processes for a disk unit group which includes a master disk unit and other disk units, and for operating in response to read/write requests issued by a processor to the disk unit group, said control unit comprising:

write means for writing to the master disk unit write data received from the processor in a write request issued to the disk unit group;

after write means for writing the write data to all of the other disk units after said write means wrote the write data to the master disk unit;

read disk select means for selecting a read disk unit from the other disk units other than said master disk unit, in response to a read request issued to the disk unit group; and read transfer means for transferring read data from the read disk unit to the processor.

33. The control unit of claim 32, including multi read request receive means for receiving at least two read requests prior to executing one of the at least two read requests;

said read disk select means selecting a corresponding at least two of the other disk units, as read disk units to execute respective ones of the at least two read requests; and said read transfer means transferring corresponding read data requested in the at least two read requests, from each of the read disk units in parallel.

34. A control unit for processing read/write processes for a disk unit group which includes a master disk unit and other disk units, and for operating in response to read/write requests issued by a processor to the disk unit group, said control unit comprising:

a cache memory;

write means for writing to the master disk unit write data received from the processor in a write request issued to the disk unit group;

after write means for writing the write data to all of the other disk units after said write means has written the write data to the master disk unit; and prefetch means for transferring prefetch data, which is not requested from the processor in a read request issued to the disk unit group, from an arbitrary disk unit in the disk unit group to said cache memory, wherein said prefetch means includes disk select means for selecting a prefetch disk unit from the other disk units before the read request is issued to the disk unit group; and means for transferring the prefetch data identified in the read request from the prefetch disk unit to said cache memory before the read request is issued.

35. The control unit of claim 34, wherein said disk select means selects at least two prefetch disk units corresponding to at least two read requests; and said means for transferring transfers prefetch data from corresponding ones of said prefetch disk units to said cache memory in parallel.

36. A control method of a control unit processing read/write processes for a disk unit group which includes a master disk unit and other disk units, and which control unit is operable in response to read/write requests issued by a processor to the disk unit group, said control method comprising the steps of:

writing to the master disk write data received from the processor in a write request issued to the disk unit group;

writing the write data to all the other disk units after said first mentioned writing; and transferring to the processor read data, requested from the processor in a read request issued to the disk unit group, from an arbitrary disk unit in the disk unit group other than said master disk unit.

37. The control method of claim 36, further including the steps of:

receiving at least two read requests from the processor;

selecting at least two of the disk units, corresponding in number to the number of read requests; and wherein said transferring transfers read data requested in the at least two read requests from the at least two disk units in parallel.

38. A control method according to claim 36, wherein said transferring includes selecting a read disk unit from the other disk units to execute a read request issued to the disk unit group.

39. The control method of claim 38, further including the steps of:

receiving at least two read requests;

selecting at least two of the other disk units, to execute respective ones of the at least two read requests; and transferring read data requested in the at least two read requests from each of the at least two other disk units in parallel.

40. A control method of a control unit including a cache and processing read/write processes for a disk unit group which includes a master disk unit and other disk units and which control unit is operable under control of read/write requests issued by a processor to the disk unit group, said control method comprising the steps of:

writing to the master disk write data received from the processor in a write request issued to the disk unit group;

writing the write data to all the other disk units after said first mentioned writing;

transferring data, not requested from a processor in a read request issued to the disk unit group, from an arbitrary disk unit in the disk unit group to the cache.

41. The control method of claim 40, further including the steps of:

multi prefetch means for transferring prefetch data, which is not requested from the processor in a read request issued to the disk unit group, from at least two arbitrary ones of the disk units to said cache in parallel.

42. A control method of a control unit including a cache and processing read/write processes for a disk unit group which includes a cache, master disk unit and other disk units and which control unit is operable under control of read/write requests issued by a processor to the disk unit group, said control method comprising the steps of:

writing to the master disk write data received from the processor in a write request issued to the disk unit group;

writing the write data to all of the other disk units after said first mentioned writing;

selecting a prefetch disk unit from all the other disk units other than said master disk unit; and transferring prefetch data from the prefetch disk unit to the cache when the prefetch data is identified in a read request that has not yet issued from a processor.

43. The control method of claim 42, further including the steps of:

selecting at least two disk units from the other disk units, as prefetch disk units to transfer prefetch data which is not requested in read requests issued to the disk unit group; and transferring prefetch data from each of prefetch disk units to the cache in parallel.

44. A control unit for processing input/output processes for a disk unit group of disk units, the disk unit group being operable under the control of a processor issuing read/write requests to the control unit for the disk unit group, said control unit comprising:

write means for processing a write request from the processor to the disk unit group for writing write data of any write request from the processor to only one disk unit of the disk unit group and thereafter reporting write completion to the processor; and after write means for thereafter writing the same write data to all the other disk units of the disk unit group.

45. A disk storage system, comprising:

a disk unit group including a plurality of disk units, each being means for storing identical data;

means for selecting an arbitrary one of said disk units from said disk unit group in response to a write request from a processor based upon criteria that the one disc unit is inactive;

write means for writing write data of the write request into only the one disk unit of said disk unit group in response to the write request from the processor and thereafter reporting write completion to the processor; and after write means for writing the write data into each of said disk units other than the one disk unit after said write means wrote the write data into the one disk unit and after said write means reported write completion.

46. A controller method for control of storage with respect to at least one storage group having plural storage units, comprising:

selecting only one of the storage units for a write request received from a processor for the storage group;

said selecting being based upon criteria that the selected storage unit is arbitrary with respect to the processor write request and is an inactive storage unit;

thereafter completing the write request by writing to only the selected storage unit;

thereafter reporting completion of the write request to the processor; and thereafter afterwriting to others of the storage units.

47. A storage control unit for processing input/output processes for a storage unit group including a plurality of storage units, the storage control unit having a plurality of transfer control means for executing data transfer operations between the storage units and a plurality of processors under control of the processors issuing read/write requests to the control unit for the storage unit group, each of said transfer control means comprising:

means for selecting, from the storage unit group, one of the storage units which is not performing either a read or write operation, in response to a read request from one of the processors; and read means for reading read data, requested in the read request, from said one of the storage units and transferring the read data to said one of the processors, wherein the reading and transferring of said read means are conducted in parallel for the plurality of processors.

* * * * *